United States Patent
Parra Rapado et al.

(10) Patent No.: US 12,213,483 B1
(45) Date of Patent: Feb. 4, 2025

(54) HERBICIDAL COMPOSITIONS COMPRISING TRIFLUDIMOXAZIN

(71) Applicant: BASF SE, Ludwigshafen (DE)

(72) Inventors: Liliana Parra Rapado, Limburgerhof (DE); Tobias Seiser, Ludwigshafen (DE); Dustin Franklin Lewis, Apex, NC (US); Douglas Findley, Research Triangle Park, NC (US); Brendan Metzger, Mississauga (CA); Fernanda Nunes Bressanin, Santo Antonio de Posse (BR); Sudakir Sudakir, Jakarta (ID); Silke Zeyer, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 18/793,091

(22) Filed: Aug. 2, 2024

(51) Int. Cl.
*A01N 43/84* (2006.01)
*A01N 43/54* (2006.01)
*A01P 13/00* (2006.01)

(52) U.S. Cl.
CPC .............. *A01N 43/84* (2013.01); *A01N 43/54* (2013.01); *A01P 13/00* (2021.08)

(58) Field of Classification Search
None
See application file for complete search history.

(56) References Cited

U.S. PATENT DOCUMENTS

| | | |
|---|---|---|
| 2020/0359631 A1 | 11/2020 | Winter et al. |
| 2022/0322665 A1 | 10/2022 | Jin et al. |
| 2022/0322666 A1 | 10/2022 | Jin et al. |
| 2023/0143563 A1 | 5/2023 | Sada et al. |

FOREIGN PATENT DOCUMENTS

| | | |
|---|---|---|
| WO | WO-01/83459 | 11/2001 |
| WO | WO-01/83459 A2 | 11/2001 |
| WO | WO-2010/145992 | 12/2010 |
| WO | WO-2017/202768 | 11/2017 |
| WO | WO-2019/030098 A1 | 2/2019 |
| WO | WO-2021/148302 | 7/2021 |

OTHER PUBLICATIONS

Sukhoverkov, K. V. et al. "A systematic approach for finding herbicide synergies" bioRxiv Feb. 24, 2021 preprint, p. 1-22 (https://www.biorxiv.org/content/10.1101/2021.02.08.430187v2.full.pdf).*
European Search Report for EP Patent Application No. 23189681.2, Issued on Feb. 6, 2024, 4 pages.
European Search Report for EP Patent Application No. 23189680.4, Issued on Feb. 5, 2024, 4 pages.
U.S. Appl. No. 18/793,148, filed Aug. 2, 2024, Liliana Parra Rapado et al.

* cited by examiner

*Primary Examiner* — Erin E Hirt
(74) *Attorney, Agent, or Firm* — MARSHALL, GERSTEIN & BORUN LLP

(57) ABSTRACT

The present invention relates to a method for post-emergent weed control, which comprises applying an effective amount of a composition comprising herbicide A (component A), trifludimoxazin (component B) and optionally saflufenacil (component C) to emerged weeds, or an area, where weeds are growing.

16 Claims, No Drawings

HERBICIDAL COMPOSITIONS COMPRISING TRIFLUDIMOXAZIN

The present invention relates to a method for post-emergent weed control, which comprises applying an effective amount of a composition comprising herbicide A (component A), trifludimoxazin (component B) and optionally saflufenacil (component C) to emerged weeds, or an area, where weeds are growing.

One concern of farmers is the presence of unwanted plants in the area were crop plants are grown or are to be grown. The crop plants have to compete with the weeds on resources like space, water, sunlight or nutrients, which leads e.g. to decreased crop yield.

Further control of already emerged weeds (i.e. post-emergent weed control) is advantageous, as the farmer is able to easily identify not only the area, where weed-control is needed, but also the weed species as such. Thus, post-emergent weed control offers specific weed control, i.e. the farmer can adjust the weed control to the specific needs.

Therefore, there is a need for highly effective post-emergent weed control, e.g. foliar weed control.

Herbicide A and its use to control emerged unwanted plants has been described in WO 2017/202768.

While herbicide A shows excellent herbicidal activity, there is still room for improvement, for example regarding activity, spectrum of activity, application rates, compatibility with useful plants and especially efficient and reliable control of unwanted plants.

Trifludimoxazin and its use to control unwanted plants has been described e.g. in WO 2010/145992).

Saflufenacil and its use to control unwanted plants has been described e.g. in WO 2001/083459).

In crop protection, it is desirable in principle to increase the specific activity of an active compound and the reliability of the effect. It is particularly desirable to control weeds (i.e. unwanted plants) effectively, but at the same time to be compatible with the useful plants in question. Also desirable is a broad spectrum of activity allowing the simultaneous control of unwanted plants. Frequently, this cannot be achieved using a single herbicidally active compound.

It is known that special combinations of different specifically active herbicides result in enhanced activity of an herbicide in the sense of a synergistic effect. In this manner, it is possible to reduce the application rates of herbicides required for controlling unwanted plants.

Mixtures comprising herbicide A, trifludimoxazin and/or saflufenacil have been described, for example in WO 2017/202768, US 2022/0322665 and US 2022/0322666.

However there remains the need for a post-emergent weed-control, especially of Commelinids, which provides efficient control of emerged weeds.

It is an object of the present invention to provide a method for post-emergent weed control, which comprises applying an effective amount of an herbicidal composition to an area, where weeds are growing.

The composition should also show an accelerated action on unwanted plants.

Surprisingly, it has been found that application of a composition comprising an herbicide A, trifludimoxazin and optionally saflufenacil have, when applied post-emergent, better herbicidal activity against (emerged) weeds, than would have been expected based on the herbicidal activity observed for the individual compounds.

I.e., it has been found that post-emergent application of a composition comprising an herbicide A (component A), trifludimoxazin (component B), and optionally saflufenacil (component C) to (emerged) weeds result in enhanced activity in the sense of a synergistic effect.

The herbicidal activity to be expected for mixtures based on the individual compound can be calculated using Colby's formula (see below). If the activity observed exceeds the expected additive activity of the individual compounds, synergism is said to be present.

Accordingly, the present invention relates to a method for post-emergent weed control, which comprises applying an effective amount of a composition comprising
- A) herbicide A (component A) selected from the group consisting of
    - A-1: ethyl 2-[2-[[3-chloro-5-fluoro-6-[3-methyl-2,6-dioxo-4-(trifluoromethyl)pyrimidin-1-yl]-2-pyridyl]oxy]phenoxy]acetate;
    - A-2: 2-[2-[[3-chloro-5-fluoro-6-[3-methyl-2,6-dioxo-4-(trifluoromethyl)pyrimidin-1-yl]-2-pyridyl]oxy]phenoxy]acetic acid including its agriculturally acceptable salts;
- B) trifludimoxazin; and
- C) optionally saflufenacil, including its agriculturally acceptable salts;

to an area, where weeds are growing.

Preferably, the present invention relates to a method for post-emergent weed control, which comprises applying an effective amount of a composition comprising
- A) herbicide A-1: ethyl 2-[2-[[3-chloro-5-fluoro-6-[3-methyl-2,6-dioxo-4-(trifluoromethyl)-pyrimidin-1-yl]-2-pyridyl]oxy]phenoxy]acetate;
- B) trifludimoxazin; and
- C) optionally saflufenacil, including its agriculturally acceptable salts; to an area, where weeds are growing.

Also preferably, the present invention relates to a method for post-emergent weed control, which comprises applying an effective amount of a composition comprising
- A) herbicide A-1: ethyl 2-[2-[[3-chloro-5-fluoro-6-[3-methyl-2,6-dioxo-4-(trifluoromethyl)-pyrimidin-1-yl]-2-pyridyl]oxy]phenoxy]acetate; and
- B) trifludimoxazin; to an area, where weeds are growing.

Also preferably, the present invention relates to a method for post-emergent weed control, which comprises applying an effective amount of a composition comprising
- A) herbicide A-1: ethyl 2-[2-[[3-chloro-5-fluoro-6-[3-methyl-2,6-dioxo-4-(trifluoromethyl)-pyrimidin-1-yl]-2-pyridyl]oxy]phenoxy]acetate;
- B) trifludimoxazin; and
- C) saflufenacil, including its agriculturally acceptable salts;

to an area, where weeds are growing.

Also preferably, the present invention relates to a method for post-emergent weed control, which comprises applying an effective amount of a composition comprising
- A) herbicide A-1: ethyl 2-[2-[[3-chloro-5-fluoro-6-[3-methyl-2,6-dioxo-4-(trifluoromethyl)-pyrimidin-1-yl]-2-pyridyl]oxy]phenoxy]acetate;
- B) trifludimoxazin; and
- C) saflufenacil;

to an area, where weeds are growing.

The invention also relates to a method and to compositions for post-emergent weed control, which comprises applying an effective amount of a composition comprising herbicide A (component A), trifludimoxazin, and optionally saflufenacil (component C), wherein the weight ratio of herbicide A to trifludimoxazin is in the range of from 5:1 to 1:5.

The invention also relates to a method and to compositions for post-emergent weed control, which comprises applying an effective amount of a composition comprising herbicide A (component A), trifludimoxazin, and saflufenacil (component C), wherein the weight ratio of herbicide A to saflufenacil is in the range of from 5:1 to 1:5.

The invention also relates to a method and to compositions for post-emergent weed control, which comprises applying an effective amount of a composition comprising herbicide A (component A), trifludimoxazin, and saflufenacil (component C), wherein the weight ratio of herbicide A to trifludimoxazin to saflufenacil is in the range of 5:1:1 to 1:5:5, 1:5:1 to 5:1:5 or 1:1:5 to 5:5:1.

A further aspect of the invention is a method for post-emergent weed control, which comprises applying an effective amount of a composition comprising herbicide A (component A), trifludimoxazin, and optionally saflufenacil (component C) to an area, where weeds, preferably Commelinids, are growing.

The invention also relates to a method and to compositions for post-emergent weed control, which comprises applying an effective amount of a composition of herbicide A (component A), trifludimoxazin, and optionally saflufenacil (component C), wherein the weight ratio of herbicide A to trifludimoxazin is in the range of from 5:1 to 1:5.

The invention also relates to a method and to compositions for post-emergent weed control, which comprises applying an effective amount of a composition of herbicide A (component A), trifludimoxazin, and saflufenacil (component C), wherein the weight ratio of herbicide A to saflufenacil is in the range of from 5:1 to 1:5.

The invention also relates to a method and to compositions for post-emergent weed control, which comprises applying an effective amount of a composition of herbicide A (component A), trifludimoxazin, and saflufenacil (component C), wherein the weight ratio of herbicide A to trifludimoxazin to saflufenacil is in the range of 5:1:1 to 1:5:5, 1:5:1 to 5:1:5 or 1:1:5 to 5:5:1.

A further aspect of the invention is a method for post-emergent weed control, which comprises applying an effective amount of a composition of herbicide A (component A), trifludimoxazin, and optionally saflufenacil (component C) to an area, where weeds, preferably Commelinids, are growing.

The invention furthermore relates to a method for post-emergent weed control, which comprises applying an effective amount of a composition comprising herbicide A (component A), trifludimoxazin, and optionally saflufenacil in non-crop areas, as well as in areas, where crop plants will be cultivated or are cultivated.

The invention furthermore relates to a method for post-emergent control of PPOi-resistant weeds, in particular in areas, where crop plants will be cultivated or are cultivated.

The invention also relates to a method for the desiccation or defoliation of plants.

The invention relates also to compositions in the form of herbicidal active agrochemical compositions comprising a herbicidally effective amount of a composition comprising herbicide A, trifludimoxazin and optionally saflufenacil as defined above, and also at least one liquid and/or solid carrier and/or one or more surfactants and, if desired, one or more further auxiliaries customary for agrochemical compositions.

Further embodiments of the present invention are evident from the claims, the description, and the examples. It is to be understood that the features mentioned above and still to be illustrated below of the subject matter of the invention can be applied not only in the combination given in each particular case but also in other combinations, without leaving the scope of the invention.

The preferred embodiments of the invention mentioned herein below have to be understood as being preferred either independently from each other or in combination with one another.

As used herein, the terms "control" and "controlling" refers to inhibition of growth, control of growth, reduction of growth or complete destruction of weeds.

As used herein, the terms "weeds", "undesired vegetation" and "unwanted plants" are synonyms and comprise also volunteer crop plants. Volunteer crop plants are crop plants that volunteer in planted crops. They are considered to be "undesired" or "unwanted", as they compete with the planted crop for space, moisture, nutrients, and light.

As used herein, "post emergence" refers to an herbicide treatment applied to an area during or after the weeds have germinated and emerged from the ground or growing medium (independently of the growth stage of the crop).

As used herein, "burndown" refers to the use of an herbicide to reduce weed presence at the time of treatment. Burndown is often used in minimum or no-till fields because the weeds cannot be managed by tilling the soil. The burndown application may be used post-harvest and/or prior to crop emergence. Burndown is especially useful against weeds that emerge between growing seasons.

As used herein, the term "composition" relates both to a physical admixture containing the herbicide A trifludimoxazin, and optionally saflufenacil as active ingredients, and also to the combined application of the herbicide A, trifludimoxazin, and optionally saflufenacil, which means that the herbicide A, trifludimoxazin, and optionally saflufenacil, are used together for post-emergent weed control.

When using the method and composition of the invention in a combined application of the herbicide A and trifludimoxazin, the herbicide A and trifludimoxazin can be applied simultaneously or in succession to the areas, where undesired vegetation occurs.

Preferably, the term "composition" is understood as a physical admixture of herbicide A, trifludimoxazin, and optionally saflufenacil.

As used herein, the term "agrochemical composition" refers to a composition comprising herbicide A, trifludimoxazin and optionally saflufenacil, and one or more formulation auxiliaries customary for crop protection compositions.

The term "agrochemical composition" includes formulations containing a physical admixture of the herbicide A, trifludimoxazin and optionally saflufenacil (combo-formulation), as well as kits-of-parts formulations, where the herbicide A, trifludimoxazin and optionally saflufenacil are formulated separately, i.e. as solo formulations, and ready to use formulations, such as an aqueous spray liquor, obtained by tank mixing solo- or combo-formulations of the herbicide A, trifludimoxazin and optionally saflufenacil. The agrochemical compositions generally contain at least one formulation auxiliary, such as one or more surfactants, and at least one liquid or solid carrier.

In the present method and present composition, the group of herbicide A consists of the following members:

TABLE A

| # | Herbicide A |
|---|---|
| A-1 | ethyl 2-[2-[[3-chloro-5-fluoro-6-[3-methyl-2,6-dioxo-4-(trifluoromethyl)pyrimidin-1-yl]-2-pyridyl]oxy]phenoxy]acetate |
| A-2 | 2-[2-[3-chloro-5-fluoro-6-[3-methyl-2,6-dioxo-4-(trifluoromethyl)pyrimidin-1-yl]-2-pyridylloxylphenoxy]acetic acid including its agriculturally acceptable salts |

The herbicides A are known in the art and are described in more detail e.g. in WO 2017/202768.

The herbicide A.1 as described might have different forms, e.g. a specific crystalline form, accordingly the herbicide A.1 as described herein also includes such different forms.

For example the herbicide A.1 might be present in its crystalline form as disclosed in WO 17/202768.

As herbicide A-2 described herein is a carboxylic acid, it has ionizable functional groups, i.e. it can also be employed in the form of its agriculturally acceptable salts. Suitable are, in general, the salts of those cations and the acid addition salts of those acids whose cations and anions, respectively, have no adverse effect on the activity of the active compounds.

Preferred cations are the ions of the alkali metals, preferably of lithium, sodium and potassium, of the alkaline earth metals, preferably of calcium and magnesium, and of the transition metals, preferably of manganese, copper, zinc and iron, further ammonium and substituted ammonium in which one to four hydrogen atoms are replaced by $C_1$-$C_4$-alkyl, hydroxy-$C_1$-$C_4$-alkyl, $C_1$-$C_4$-alkoxy-$C_1$-$C_4$-alkyl, hydroxy-$C_1$-$C_4$-alkoxy-$C_1$-$C_4$-alkyl, phenyl or benzyl, preferably ammonium, methyl-ammonium, isopropylammonium, butylammonium, dimethylammonium, diethyl-ammonium, dipropylammonium, diisopropylammonium, dibutylammonium, trimethylammonium, triethyl-ammonium, tris(isopropyl)ammonium, heptylammonium, dodecylammonium, tetradecylammonium, tetramethylammonium, tetraethylammonium, tetrabutylammonium, 2-hydroxyethylammonium (olamine salt), 2-(2-hydroxyeth-1-oxy)eth-1-ylammonium (diglycolamine salt), di(2-hydroxyeth-1-yl)ammonium (diolamine salt), tris(2-hydroxyethyl)-ammonium (trolamine salt), tris(2-hydroxypropyl)-ammonium, benzyltrimethylammonium, benzyltriethylammonium, N,N,N-trimethylethanolammonium (choline salt), furthermore phosphonium ions, sulfonium ions, preferably tri($C_1$-$C_4$-alkyl)sulfonium, such as trimethylsulfonium, and sulfoxonium ions, preferably tri($C_1$-$C_4$-alkyl)sulfoxonium, and finally the salts of polybasic amines such as N,N-bis-(3-aminopropyl)methylamine and diethylenetriamine. Other possible salts are ethoxylated fatty acid amine (e.g. ethoxylated coconut fatty acid amine), Genamin® C 200, Genamine® C 150, Genamine® C 100, Genamine® C 050 or Genamine® C 020, all sold by Clariant.

According to a preferred embodiment of the invention, the composition comprises as component A at least one, preferably exactly one, herbicide A-1.

According to another preferred embodiment of the invention, the composition comprises as component A at least one, preferably exactly one, herbicide A-2.

In the present method and present composition, the required application rate of the herbicide A (component A of the composition) without formulation auxiliaries, depends on the kind of effect desired, the density of the undesired vegetation, on the development stage of the unwanted plants, on the climatic conditions of the location where the composition is used, and on the application method.

In general, the application rate of herbicide A (component A of the composition), is from 50 g/ha to 5 g/ha,
preferably from 40 to 6 g/ha,
more preferably from 37.5 to 9 g/ha,
especially preferably from 37.5 to 12.5 g/ha;
of active substance.

In another embodiment of the invention, the application rate of the herbicide A is from 25 g/ha to 5 g/ha,
preferably from 25 to 12.5 g/ha,
of active substance.

In another embodiment of the invention, the application rate of the herbicide A is from 40 g/ha to 25 g/ha,
preferably from 37.5 to 25 g/ha,
of active substance.

In another embodiment of the invention, the application rate of herbicide A is from 5 g/ha to 100 g/ha,
preferably from 9 to 50 g/ha,
more preferably from 12.5 to 50 g/ha,
of active substance.

In another embodiment of the invention, the application rate of herbicide A is from 10 g/ha to 50 g/ha,
preferably from 12 g/ha to 30 g/ha;
also preferably 12.5 g/ha, 20 g/ha, 25 g/ha or 30 g/ha.

In another embodiment of the invention, the application rate of herbicide A is from 25 g/ha to 50 g/ha,
preferably from 25 g/ha or 50 g/ha.

In another embodiment of the invention, the application rate of herbicide A is from 100 g/ha to 5 g/ha,
preferably from 75 to 6 g/ha,
more preferably from 50 g/ha to 9 g/ha,
especially preferably from 37.5 to 12.5 g/ha;
of active substance.

In another embodiment of the invention, the application rate of the herbicide A is from 50 g/ha to 25 g/ha,
preferably from 37.5 to 25 g/ha,
of active substance.

In another embodiment of the invention, the application rate of the herbicide A is from 45 g/ha to 27.5 g/ha,
preferably from 40 to 30 g/ha,
of active substance.

In another embodiment of the invention, the application rate of the herbicide A is from 22.5 g/ha to 6 g/ha,
preferably from 20 to 12.5 g/ha,
of active substance.

In another embodiment of the invention, the total application rate of active ingredients (i.e. herbicide A, trifludimoxazin and optionally saflufenacil together) does not exceed about 150 g/ha, preferably does not exceed 150 g/ha.

In another embodiment of the invention, the application rate of the herbicide A (component A), is about 50 g/ha, preferably is 50 g/ha.

In another embodiment of the invention, the application rate of the herbicide A is about 45 g/ha, preferably is 45 g/ha.

In another embodiment of the invention, the application rate of the herbicide A, is about 40 g/ha, preferably is 40 g/ha.

In another embodiment of the invention, the application rate of the herbicide A is about 37.5 g/ha, preferably is 37.5 g/ha.

In another embodiment of the invention, the application rate of the herbicide A is about 34 g/ha, preferably is 34 g/ha.

In another embodiment of the invention, the application rate of the herbicide A is about 30 g/ha, preferably is 30 g/ha.

In another embodiment of the invention, the application rate of the herbicide A is about 27.5 g/ha, preferably is 27.5 g/ha.

In another embodiment of the invention, the application rate of the herbicide A is about 25 g/ha, preferably is 25 g/ha.

In another embodiment of the invention, the application rate of the herbicide A is about 22.5 g/ha, preferably is 22.5 g/ha.

In another embodiment of the invention, the application rate of the herbicide A (component A) is about 20 g/ha, preferably is 20 g/ha.

In another embodiment of the invention, the application rate of the herbicide A is about 18 g/ha, preferably is 18 g/ha.

In another embodiment of the invention, the application rate of the herbicide A is about 16 g/ha, preferably is 16 g/ha.

In another embodiment of the invention, the application rate of the herbicide A is about 14 g/ha, preferably is 14 g/ha.

In another embodiment of the invention, the application rate of the herbicide A is about 12.5 g/ha, preferably is 12.5 g/ha.

In another embodiment of the invention, the application rate of the herbicide A is about 10 g/ha, preferably is 10 g/ha.

In another embodiment of the invention, the application rate of the herbicide A is about 9 g/ha, preferably is 9 g/ha.

In another embodiment of the invention, the application rate of the herbicide A is about 8 g/ha, preferably is 8 g/ha.

In another embodiment of the invention, the application rate of the herbicide A is about 6 g/ha, preferably is 6 g/ha.

"About" as used herein includes a range of the specified amount, wherein the specified amount is increased or decreased by 10%. For example, "about 20 g/ha" includes a range of 22 g/ha to 18 g/ha.

In another embodiment of the invention, the application rate [g/ha] of the herbicide A is 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 15.75, 16, 16.25, 16.5, 16.75, 17, 17.25, 17.5, 17.75, 18, 18.25, 18.5, 18.75, 19, 19.25, 19.5, 19.75, 20, 20.25, 20.5, 20.75, 21, 21.25, 21.5, 21.75, 22, 22.25, 22.5, 22.75, 23, 23.25, 23.5, 23.75, 24, 24.25, 24.5, 24.75, 25, 25.25, 25.5, 25.75, 26, 26.25, 26.5, 26.75, 27, 27.25, 27.5, 27.75, 28, 28.25, 28.5, 28.75, 29, 29.25, 29.5, 29.75, 30, 30.25, 30.5, 30.75, 31, 31.25, 31.5, 31.75, 32, 32.25, 32.5, 32.75, 33, 33.25, 33.5, 33.75, 34, 34.25, 34.5, 34.75, 35, 35.25, 35.5, 35.75, 36, 36.25, 36.5, 36.75, 37, 37.25, 37.5, 37.75, 38, 38.25, 38.5, 38.75, 39, 39.25, 39.5, 39.75, 40, 40.25, 40.5, 40.75, 41, 41.25, 41.5, 41.75, 42, 42.25, 42.5, 42.75, 43, 43.25, 43.5, 43.75, 44, 44.25, 44.5, 44.75, 45, 45.25, 45.5, 45.75, 46, 46.25, 46.5, 46.75, 47, 47.25, 47.5, 47.75, 48, 48.25, 48.5, 48.75, 49, 49.25, 49.5, 49.75, or 50 g/ha.

Trifludimoxazin is well known in the art and described in more detail e.g. in "The compendium of Pesticide common Names", http://www.alanwood.net/pesticides/.

Trifludimoxazin might have different forms, e.g. a specific crystalline or particle form. Accordingly trifludimoxazin might be present in its crystalline form as disclosed in WO 2013/174693, or in form of particles as disclosed in WO 2015/071087.

In the present method and present composition, the required application rate of trifludimoxazin (component B of the composition) without formulation auxiliaries, depends on the kind of effect desired, the density of the undesired vegetation, on the development stage of the unwanted plants, on the climatic conditions of the location where the composition is used, and on the application method.

In general, the application rate of trifludimoxazin (component B of the composition), is from 50 g/ha to 5 g/ha,
preferably from 40 to 6 g/ha,
more preferably from 37.5 to 9 g/ha,
especially preferably from 37.5 to 12.5 g/ha;
of active substance.

In another embodiment of the invention, the application rate of trifludimoxazin is from 25 g/ha to 5 g/ha,
preferably from 25 to 12.5 g/ha,
of active substance.

In another embodiment of the invention, the application rate of trifludimoxazin is from 50 g/ha to 25 g/ha,
preferably from 37.5 to 25 g/ha,
of active substance.

In another embodiment of the invention, the application rate of trifludimoxazin is from 40 g/ha to 25 g/ha,
preferably from 37.5 to 25 g/ha,
of active substance.

In another embodiment of the invention, the application rate of trifludimoxazin, is from 50 g/ha to 25 g/ha,
preferably from 50 to 37.5 g/ha,
of active substance.

In another embodiment of the invention, the application rate of the herbicide A is from 22.5 g/ha to 10 g/ha,
preferably from 20 to 12.5 g/ha,
of active substance.

In another embodiment of the invention, the total application rate of herbicide A, trifludimoxazin and optionally saflufenacil together does not exceed about 125 g/ha, preferably 125 g/ha.

In another embodiment of the invention, the application rate of trifludimoxazin is about 40 g/ha, preferably is 40 g/ha.

In another embodiment of the invention, the application rate of trifludimoxazin is about 37.5 g/ha, preferably is 37.5 g/ha.

In another embodiment of the invention, the application rate of trifludimoxazin is about 34 g/ha, preferably is 34 g/ha.

In another embodiment of the invention, the application rate of trifludimoxazin is about 30 g/ha, preferably is 30 g/ha.

In another embodiment of the invention, the application rate of trifludimoxazin is about 25 g/ha, preferably is 25 g/ha.

In another embodiment of the invention, the application rate of trifludimoxazin is about 22.5 g/ha, preferably is 22.5 g/ha.

In another embodiment of the invention, the application rate of trifludimoxazin is about 20 g/ha, preferably is 20 g/ha.

In another embodiment of the invention, the application rate of trifludimoxazin is about 18 g/ha, preferably is 18 g/ha.

In another embodiment of the invention, the application rate of trifludimoxazin is about 16 g/ha, preferably is 16 g/ha.

In another embodiment of the invention, the application rate of trifludimoxazin is about 14 g/ha, preferably is 14 g/ha.

In another embodiment of the invention, the application rate of trifludimoxazin is about 12.5 g/ha, preferably is 12.5 g/ha.

In another embodiment of the invention, the application rate of trifludimoxazin is about 10 g/ha, preferably is 10 g/ha.

In another embodiment of the invention, the application rate of trifludimoxazin is about 9 g/ha, preferably is 9 g/ha.

In another embodiment of the invention, the application rate of trifludimoxazin is about 8 g/ha, preferably is 8 g/ha.

In another embodiment of the invention, the application rate of trifludimoxazin is about 6 g/ha, preferably is 6 g/ha.

"About" as used herein includes a range of the specified amount, wherein the specified amount is increased or decreased by 10%. For example, "about 20 g/ha" includes a range of 22 g/ha to 18 g/ha.

In another embodiment of the invention, the application rate [g/ha] of trifludimoxazin is 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 15.75, 16, 16.25, 16.5, 16.75, 17, 17.25, 17.5, 17.75, 18, 18.25, 18.5, 18.75, 19, 19.25, 19.5, 19.75, 20, 20.25, 20.5, 20.75, 21, 21.25, 21.5, 21.75, 22, 22.25, 22.5, 22.75, 23, 23.25, 23.5, 23.75, 24, 24.25, 24.5, 24.75, 25, 25.25, 25.5, 25.75, 26, 26.25, 26.5, 26.75, 27, 27.25, 27.5, 27.75, 28, 28.25, 28.5, 28.75, 29, 29.25, 29.5, 29.75, 30, 30.25, 30.5, 30.75, 31, 31.25, 31.5, 31.75, 32, 32.25, 32.5, 32.75, 33, 33.25, 33.5, 33.75, 34, 34.25, 34.5, 34.75, 35, 35.25, 35.5, 35.75, 36, 36.25, 36.5, 36.75, 37, 37.25, 37.5, 37.75, 38, 38.25, 38.5, 38.75, 39, 39.25, 39.5, 39.75, 40, 40.25, 40.5, 40.75, 41, 41.25, 41.5, 41.75, 42, 42.25, 42.5, 42.75, 43, 43.25, 43.5, 43.75, 44, 44.25, 44.5, 44.75, 45, 45.25, 45.5, 45.75, 46, 46.25, 46.5, 46.75, 47, 47.25, 47.5, 47.75, 48, 48.25, 48.5, 48.75, 49, 49.25, 49.5, 49.75, or 50 g/ha.

The present methods and compositions optionally comprise a third herbicide C (component C) selected from saflufenacil including its agriculturally acceptable salts.

Surprisingly, it has also been found that a composition comprising herbicide A, trifludimoxazin and saflufenacil including its agriculturally acceptable salts has, when applied post-emergent, better herbicidal activity against (emerged) weeds, than would have been expected based on the herbicidal activity observed for the individual compounds or the respective 2-way mixtures; i.e., it has been found that post-emergent application of a composition comprising herbicide A (component A), trifludimoxazin (component B) and saflufenacil (component C) to (emerged) weeds result in enhanced activity in the sense of a synergistic effect.

The herbicidal activity to be expected for mixtures based on the individual compound can be calculated using Colby's formula (see below). If the activity observed exceeds the expected additive activity of the individual compounds, synergism is said to be present.

Saflufenacil is well known in the art and described in more detail e.g. in "The compendium of Pesticide common Names", http://www.alanwood.net/pesticides/.

Saflufenacil might have different forms, e.g. a specific crystalline or particle form. Accordingly saflufenacil as described herein also include such different forms. For example saflufenacil might be present in its crystalline form as disclosed in WO 08/43835 or WO 08/43836.

As saflufenacil as described herein has ionizable functional groups, it can also be employed in the form of its agriculturally acceptable salts. Suitable are, in general, the salts of those cations and the acid addition salts of those acids whose cations and anions, respectively, have no adverse effect on the activity of the active compounds.

Preferred cations are the ions of the alkali metals, preferably of lithium, sodium and potassium, of the alkaline earth metals, preferably of calcium and magnesium, and of the transition metals, preferably of manganese, copper, zinc and iron, further ammonium and substituted ammonium in which one to four hydrogen atoms are replaced by $C_1$-$C_4$-alkyl, hydroxy-$C_1$-$C_4$-alkyl, $C_1$-$C_4$-alkoxy-$C_1$-$C_4$-alkyl, hydroxy-$C_1$-$C_4$-alkoxy-$C_1$-$C_4$-alkyl, phenyl or benzyl, preferably ammonium, methylammonium, isopropylammonium, butylammonium, dimethylammonium, diethyl-ammonium, dipropylammonium, diisopropylammonium, dibutylammonium, trimethylammonium, triethylammonium, tris(isopropyl)ammonium, heptylammonium, dodecylammonium, tetra-decylammonium, tetramethylammonium, tetraethylammonium, tetrabutylammonium, 2-hydroxy-ethylammonium (olamine salt), 2-(2-hydroxyeth-1-oxy)eth-1-ylammonium (diglycolamine salt), di(2-hydroxyeth-1-yl) ammonium (diolamine salt), tris(2-hydroxyethyl) ammonium (trolamine salt), tris(2-hydroxypropyl) ammonium, benzyltrimethylammonium, benzyltriethylammonium, N,N,N-trimethylethanolammonium (choline salt), furthermore phosphonium ions, sulfonium ions, preferably tri($C_1$-$C_4$-alkyl)sulfonium, such as trimethylsulfonium, and sulfoxonium ions, preferably tri ($C_1$-$C_4$-alkyl)sulfoxonium, and finally the salts of polybasic amines such as N,N-bis-(3-aminopropyl)methylamine and diethylenetriamine.

Other possible salts are ethoxylated fatty acid amine (e.g. ethoxylated coconut fatty acid amine), Genamin® C 200, Genamine® C 150, Genamine® C 100, Genamine® C 050 or Genamine® C 020, all sold by Clariant.

Especially preferred cations are butylammonium, dimethylammonium, dipropylammonium, diisopropylammonium, dibutylammonium, triethylammonium, 2-hydroxyethylammonium (olamine salt), 2-(2-hydroxyeth-1-oxy)eth-1-ylammonium (diglycolamine salt), di(2-hydroxyeth-1-yl)ammonium (diolamine salt), tris(2-hydroxyethyl)ammonium (trolamine salt) and tris(2-hydroxypropyl)ammonium.

Preferred examples of saflufenacil including its agriculturally acceptable salts, which can be used in combination with herbicide A according to the present invention are saflufenacil, saflufenacil sodium and saflufenacil potassium.

In the present method and compositions the following examples of saflufenacil including its agriculturally acceptable salts are preferred as optional herbicide C:

TABLE C

| # | Herbicide C |
|---|---|
| C-1 | saflufenacil |
| C-2 | saflufenacil-sodium |
| C-3 | saflufenacil-potassium |

Especially preferred is C-1.

In the present method and present composition, the required application rate of saflufenacil (optional component C of the composition) without formulation auxiliaries, depends on the kind of effect desired, the density of the undesired vegetation, on the development stage of the unwanted plants, on the climatic conditions of the location where the composition is used, and on the application method.

In general, the application rate of saflufenacil (optional component C), is from 50 g/ha to 5 g/ha, preferably from 40 to 6 g/ha, more preferably from 37.5 to 9 g/ha, especially preferably from 37.5 to 12.5 g/ha;
of active substance.

In another embodiment of the invention, the application rate of saflufenacil is from 25 g/ha to 5 g/ha,
preferably from 25 to 12.5 g/ha,
of active substance.

In another embodiment of the invention, the application rate of saflufenacil is from 40 g/ha to 25 g/ha,
preferably from 37.5 to 25 g/ha,
of active substance.

In another embodiment of the invention, the application rate of saflufenacil is from 50 g/ha to 25 g/ha,
preferably from 37.5 to 25 g/ha,
of active substance.

In another embodiment of the invention, the application rate of saflufenacil is from 50 g/ha to 25 g/ha,
preferably from 50 to 37.5 g/ha,
of active substance.

In another embodiment of the invention, the application rate of saflufenacil is from 100 g/ha to 30 g/ha,
preferably from 80 to 40 g/ha,
more preferably from 75 to 50 g/ha,
also more preferably from 75 to 54 g/ha,
of active substance.

In another embodiment of the invention, the application rate of saflufenacil is from 22.5 g/ha to 10 g/ha,
preferably from 20 to 12.5 g/ha,
of active substance.

In another embodiment of the invention, the total application rate of herbicide A, trifludimoxazin and saflufenacil together does not exceed about 125 g/ha, preferably 125 g/ha.

In another embodiment of the invention, the application rate of saflufenacil (component C), is about 75 g/ha, preferably is 75 g/ha.

In another embodiment of the invention, the application rate of saflufenacil is about 60 g/ha, preferably is 60 g/ha.

In another embodiment of the invention, the application rate of saflufenacil is about 54 g/ha, preferably is 54 g/ha.

In another embodiment of the invention, the application rate of saflufenacil is about 50 g/ha, preferably is 50 g/ha.

In another embodiment of the invention, the application rate of saflufenacil is about 40 g/ha, preferably is 40 g/ha.

In another embodiment of the invention, the application rate of saflufenacil is about 37.5 g/ha, preferably is 37.5 g/ha.

In another embodiment of the invention, the application rate of saflufenacil is about 34 g/ha, preferably is 34 g/ha.

In another embodiment of the invention, the application rate of saflufenacil is about 30 g/ha, preferably is 30 g/ha.

In another embodiment of the invention, the application rate of saflufenacil is about 25 g/ha, preferably is 25 g/ha.

In another embodiment of the invention, the application rate of saflufenacil is about 22.5 g/ha, preferably is 22.5 g/ha.

In another embodiment of the invention, the application rate of saflufenacil is about 20 g/ha, preferably is 20 g/ha.

In another embodiment of the invention, the application rate of saflufenacil is about 18 g/ha, preferably is 18 g/ha.

In another embodiment of the invention, the application rate of saflufenacil is about 16 g/ha, preferably is 16 g/ha.

In another embodiment of the invention, the application rate of saflufenacil is about 14 g/ha, preferably is 14 g/ha.

In another embodiment of the invention, the application rate of saflufenacil is about 12.5 g/ha, preferably is 12.5 g/ha.

In another embodiment of the invention, the application rate of saflufenacil is about 12 g/ha, preferably is 12 g/ha.

In another embodiment of the invention, the application rate of saflufenacil is about 10 g/ha, preferably is 10 g/ha.

In another embodiment of the invention, the application rate of saflufenacil is about 9 g/ha, preferably is 9 g/ha.

In another embodiment of the invention, the application rate of saflufenacil is about 8 g/ha, preferably is 8 g/ha.

In another embodiment of the invention, the application rate of saflufenacil is about 6 g/ha, preferably is 6 g/ha.

"About" as used herein includes a range of the specified amount, wherein the specified amount is increased or decreased by 10%. For example, "about 20 g/ha" includes a range of 22 g/ha to 18 g/ha.

In a preferred embodiment of the present method and present composition, the composition comprises at least herbicide A-1, preferably exactly herbicide A-1, and trifludimoxazin as component B.

In another preferred embodiment of the present method and present composition, the composition comprises herbicide A-1 and trifludimoxazin as only herbicidal active ingredients.

In another preferred embodiment of the present method and present composition, the composition consists of herbicide A-1 and trifludimoxazin.

In another preferred embodiment the present method and present composition relate to an agrochemical composition consisting of herbicide A-1, trifludimoxazin and one or more formulation auxiliaries.

In another preferred embodiment of the present method and present composition, the composition comprises at least herbicide A-1, preferably exactly herbicide A-1, trifludimoxazin as component B, and saflufenacil as component C.

In another preferred embodiment of the present method and present composition, the composition comprises at least herbicide A-2, preferably exactly herbicide A-2 and trifludimoxazin as component B.

In another preferred embodiment of the present method and present composition, the composition comprises at least herbicide A-2, preferably exactly herbicide A-2, trifludimoxazin as component B, and saflufenacil as component C.

In another preferred embodiment of the present method and present composition, the composition comprises herbicide A-1, trifludimoxazin and saflufenacil as only herbicidal active ingredients.

In another preferred embodiment of the present method and present composition, the composition comprises herbicide A-2 and trifludimoxazin as only herbicidal active ingredients.

In another preferred embodiment of the present method and present composition, the composition comprises herbicide A-2, trifludimoxazin and saflufenacil as only herbicidal active ingredients.

In another preferred embodiment of the present method and present composition, the composition comprises at least herbicide A-1, preferably exactly herbicide A-1, and the substance(s) as defined in the respective row of table 1.

Particularly preferred according to the present method and compositions are compositions 1.1 to 1.4, comprising, preferably comprising as only active ingredients, i.e. consisting of, herbicide A-1 and the substances as defined in the respective row of table 1:

TABLE 1

(compositions 1.1 to 1.4)

| # | B | C |
|---|---|---|
| 1.1 | B | — |
| 1.2 | B | C-1 |
| 1.3 | B | C-2 |
| 1.4 | B | C-3 |

In the present method and compositions,
particularly preferred are compositions 1.1 and 1.2;
especially preferred is composition 1.1;
also especially preferred is composition 1.2.

Also preferred are compositions 2.1. to 2.4 which differ from the corresponding compositions 1.1 to 1.4 only in that they comprise as the active component A herbicide A-2.

The specific number for each single composition is deductible as follows:

Composition 2.3 for example comprises herbicide A-2, trifludimoxazin (herbicide B) and saflufenacil-sodium (C-2) (see table 1, entry 1.3; as well as well as definition for compositions 2.1 to 2.4 above and table C, entry C-2).

Non-limiting examples for application rates of herbicide A, preferably A-1, and trifludimoxazin (component B) in the methods and compositions for post-emergent weed control in non-crop areas or cultivation areas of a crop are provided in Table 2:

TABLE 2

(application rates (a.r.) 2.1 to 2.270)

| # a.r. | A-1 [g/ha] | B [g/ha] |
|---|---|---|
| 2.1 | 6 | 6 |
| 2.2 | 8 | 6 |
| 2.3 | 9 | 6 |
| 2.4 | 10 | 6 |
| 2.5 | 12.5 | 6 |
| 2.6 | 14 | 6 |
| 2.7 | 16 | 6 |
| 2.8 | 18 | 6 |
| 2.9 | 20 | 6 |
| 2.10 | 22.5 | 6 |
| 2.11 | 25 | 6 |
| 2.12 | 27.5 | 6 |
| 2.13 | 30 | 6 |
| 2.14 | 34 | 6 |
| 2.15 | 37.5 | 6 |
| 2.16 | 40 | 6 |
| 2.17 | 45 | 6 |
| 2.18 | 50 | 6 |
| 2.19 | 6 | 8 |
| 2.20 | 8 | 8 |
| 2.21 | 9 | 8 |
| 2.22 | 10 | 8 |
| 2.23 | 12.5 | 8 |
| 2.24 | 14 | 8 |
| 2.25 | 16 | 8 |
| 2.26 | 18 | 8 |
| 2.27 | 20 | 8 |
| 2.28 | 22.5 | 8 |
| 2.29 | 25 | 8 |
| 2.30 | 27.5 | 8 |
| 2.31 | 30 | 8 |
| 2.32 | 34 | 8 |
| 2.33 | 37.5 | 8 |
| 2.34 | 40 | 8 |
| 2.35 | 45 | 8 |
| 2.36 | 50 | 8 |
| 2.37 | 6 | 9 |
| 2.38 | 8 | 9 |
| 2.39 | 9 | 9 |
| 2.40 | 10 | 9 |
| 2.41 | 12.5 | 9 |
| 2.42 | 14 | 9 |
| 2.43 | 16 | 9 |
| 2.44 | 18 | 9 |
| 2.45 | 20 | 9 |
| 2.46 | 22.5 | 9 |
| 2.47 | 25 | 9 |
| 2.48 | 27.5 | 9 |
| 2.49 | 30 | 9 |
| 2.50 | 34 | 9 |
| 2.51 | 37.5 | 9 |
| 2.52 | 40 | 9 |
| 2.53 | 45 | 9 |
| 2.54 | 50 | 9 |
| 2.55 | 6 | 10 |
| 2.56 | 8 | 10 |
| 2.57 | 9 | 10 |
| 2.58 | 10 | 10 |
| 2.59 | 12.5 | 10 |
| 2.60 | 14 | 10 |
| 2.61 | 16 | 10 |
| 2.62 | 18 | 10 |
| 2.63 | 20 | 10 |
| 2.64 | 22.5 | 10 |
| 2.65 | 25 | 10 |
| 2.66 | 27.5 | 10 |
| 2.67 | 30 | 10 |
| 2.68 | 34 | 10 |
| 2.69 | 37.5 | 10 |
| 2.70 | 40 | 10 |
| 2.71 | 45 | 10 |
| 2.72 | 50 | 10 |
| 2.73 | 6 | 12.5 |
| 2.74 | 8 | 12.5 |
| 2.75 | 9 | 12.5 |
| 2.76 | 10 | 12.5 |
| 2.77 | 12.5 | 12.5 |
| 2.78 | 14 | 12.5 |
| 2.79 | 16 | 12.5 |
| 2.80 | 18 | 12.5 |
| 2.81 | 20 | 12.5 |
| 2.82 | 22.5 | 12.5 |
| 2.83 | 25 | 12.5 |
| 2.84 | 27.5 | 12.5 |
| 2.85 | 30 | 12.5 |
| 2.86 | 34 | 12.5 |
| 2.87 | 37.5 | 12.5 |
| 2.88 | 40 | 12.5 |
| 2.89 | 45 | 12.5 |
| 2.90 | 50 | 12.5 |
| 2.91 | 6 | 14 |
| 2.92 | 8 | 14 |
| 2.93 | 9 | 14 |
| 2.94 | 10 | 14 |
| 2.95 | 12.5 | 14 |
| 2.96 | 14 | 14 |
| 2.97 | 16 | 14 |
| 2.98 | 18 | 14 |
| 2.99 | 20 | 14 |
| 2.100 | 22.5 | 14 |
| 2.101 | 25 | 14 |
| 2.102 | 27.5 | 14 |
| 2.103 | 30 | 14 |
| 2.104 | 34 | 14 |
| 2.105 | 37.5 | 14 |
| 2.106 | 40 | 14 |
| 2.107 | 45 | 14 |
| 2.108 | 50 | 14 |
| 2.109 | 6 | 16 |
| 2.110 | 8 | 16 |
| 2.111 | 9 | 16 |
| 2.112 | 10 | 16 |
| 2.113 | 12.5 | 16 |
| 2.114 | 14 | 16 |

TABLE 2-continued (application rates (a.r.) 2.1 to 2.270)

| # a.r. | A-1 [g/ha] | B [g/ha] |
|---|---|---|
| 2.115 | 16 | 16 |
| 2.116 | 18 | 16 |
| 2.117 | 20 | 16 |
| 2.118 | 22.5 | 16 |
| 2.119 | 25 | 16 |
| 2.120 | 27.5 | 16 |
| 2.121 | 30 | 16 |
| 2.122 | 34 | 16 |
| 2.123 | 37.5 | 16 |
| 2.124 | 40 | 16 |
| 2.125 | 45 | 16 |
| 2.126 | 50 | 16 |
| 2.127 | 6 | 18 |
| 2.128 | 8 | 18 |
| 2.129 | 9 | 18 |
| 2.130 | 10 | 18 |
| 2.131 | 12.5 | 18 |
| 2.132 | 14 | 18 |
| 2.133 | 16 | 18 |
| 2.134 | 18 | 18 |
| 2.135 | 20 | 18 |
| 2.136 | 22.5 | 18 |
| 2.137 | 25 | 18 |
| 2.138 | 27.5 | 18 |
| 2.139 | 30 | 18 |
| 2.140 | 34 | 18 |
| 2.141 | 37.5 | 18 |
| 2.142 | 40 | 18 |
| 2.143 | 45 | 18 |
| 2.144 | 50 | 18 |
| 2.145 | 6 | 20 |
| 2.146 | 8 | 20 |
| 2.147 | 9 | 20 |
| 2.148 | 10 | 20 |
| 2.149 | 12.5 | 20 |
| 2.150 | 14 | 20 |
| 2.151 | 16 | 20 |
| 2.152 | 18 | 20 |
| 2.153 | 20 | 20 |
| 2.154 | 22.5 | 20 |
| 2.155 | 25 | 20 |
| 2.156 | 27.5 | 20 |
| 2.157 | 30 | 20 |
| 2.158 | 34 | 20 |
| 2.159 | 37.5 | 20 |
| 2.160 | 40 | 20 |
| 2.161 | 45 | 20 |
| 2.162 | 50 | 20 |
| 2.163 | 6 | 22.5 |
| 2.164 | 8 | 22.5 |
| 2.165 | 9 | 22.5 |
| 2.166 | 10 | 22.5 |
| 2.167 | 12.5 | 22.5 |
| 2.168 | 14 | 22.5 |
| 2.169 | 16 | 22.5 |
| 2.170 | 18 | 22.5 |
| 2.171 | 20 | 22.5 |
| 2.172 | 22.5 | 22.5 |
| 2.173 | 25 | 22.5 |
| 2.174 | 27.5 | 22.5 |
| 2.175 | 30 | 22.5 |
| 2.176 | 34 | 22.5 |
| 2.177 | 37.5 | 22.5 |
| 2.178 | 40 | 22.5 |
| 2.179 | 45 | 22.5 |
| 2.180 | 50 | 22.5 |
| 2.181 | 6 | 25 |
| 2.182 | 8 | 25 |
| 2.183 | 9 | 25 |
| 2.184 | 10 | 25 |
| 2.185 | 12.5 | 25 |
| 2.186 | 14 | 25 |
| 2.187 | 16 | 25 |
| 2.188 | 18 | 25 |
| 2.189 | 20 | 25 |
| 2.190 | 22.5 | 25 |
| 2.191 | 25 | 25 |
| 2.192 | 27.5 | 25 |
| 2.193 | 30 | 25 |
| 2.194 | 34 | 25 |
| 2.195 | 37.5 | 25 |
| 2.196 | 40 | 25 |
| 2.197 | 45 | 25 |
| 2.198 | 50 | 25 |
| 2.199 | 6 | 30 |
| 2.200 | 8 | 30 |
| 2.201 | 9 | 30 |
| 2.202 | 10 | 30 |
| 2.203 | 12.5 | 30 |
| 2.204 | 14 | 30 |
| 2.205 | 16 | 30 |
| 2.206 | 18 | 30 |
| 2.207 | 20 | 30 |
| 2.208 | 22.5 | 30 |
| 2.209 | 25 | 30 |
| 2.210 | 27.5 | 30 |
| 2.211 | 30 | 30 |
| 2.212 | 34 | 30 |
| 2.213 | 37.5 | 30 |
| 2.214 | 40 | 30 |
| 2.215 | 45 | 30 |
| 2.216 | 50 | 30 |
| 2.217 | 6 | 34 |
| 2.218 | 8 | 34 |
| 2.219 | 9 | 34 |
| 2.220 | 10 | 34 |
| 2.221 | 12.5 | 34 |
| 2.222 | 14 | 34 |
| 2.223 | 16 | 34 |
| 2.224 | 18 | 34 |
| 2.225 | 20 | 34 |
| 2.226 | 22.5 | 34 |
| 2.227 | 25 | 34 |
| 2.228 | 27.5 | 34 |
| 2.229 | 30 | 34 |
| 2.230 | 34 | 34 |
| 2.231 | 37.5 | 34 |
| 2.232 | 40 | 34 |
| 2.233 | 45 | 34 |
| 2.234 | 50 | 34 |
| 2.235 | 6 | 37.5 |
| 2.236 | 8 | 37.5 |
| 2.237 | 9 | 37.5 |
| 2.238 | 10 | 37.5 |
| 2.239 | 12.5 | 37.5 |
| 2.240 | 14 | 37.5 |
| 2.241 | 16 | 37.5 |
| 2.242 | 18 | 37.5 |
| 2.243 | 20 | 37.5 |
| 2.244 | 22.5 | 37.5 |
| 2.245 | 25 | 37.5 |
| 2.246 | 27.5 | 37.5 |
| 2.247 | 30 | 37.5 |
| 2.248 | 34 | 37.5 |
| 2.249 | 37.5 | 37.5 |
| 2.250 | 40 | 37.5 |
| 2.251 | 45 | 37.5 |
| 2.252 | 50 | 37.5 |
| 2.253 | 6 | 40 |
| 2.254 | 8 | 40 |
| 2.255 | 9 | 40 |
| 2.256 | 10 | 40 |
| 2.257 | 12.5 | 40 |
| 2.258 | 14 | 40 |
| 2.259 | 16 | 40 |
| 2.260 | 18 | 40 |
| 2.261 | 20 | 40 |
| 2.262 | 22.5 | 40 |
| 2.263 | 25 | 40 |
| 2.264 | 27.5 | 40 |

TABLE 2-continued (application rates (a.r.) 2.1 to 2.270)

| # a.r. | A-1 [g/ha] | B [g/ha] |
|---|---|---|
| 2.265 | 30 | 40 |
| 2.266 | 34 | 40 |
| 2.267 | 37.5 | 40 |
| 2.268 | 40 | 40 |
| 2.269 | 45 | 40 |
| 2.270 | 50 | 40 |

Non-limiting examples for application rates of herbicide A, preferably A-1, trifludimoxazin (component B) and saflufenacil, preferably C-1, in the methods and compositions for post-emergent weed control in non-crop areas or cultivation areas of a crop are provided in Table 3:

TABLE 3

(application rates (a.r.) 3.1 to 3.45)

| # a.r. | A-1 [g/ha] | B [g/ha] | C-1 [g/ha] |
|---|---|---|---|
| 3.1 | 6 | 6 | 6 |
| 3.2 | 6 | 6 | 12 |
| 3.3 | 6 | 6 | 18 |
| 3.4 | 8 | 8 | 8 |
| 3.5 | 8 | 8 | 16 |
| 3.6 | 8 | 8 | 24 |
| 3.7 | 9 | 9 | 9 |
| 3.8 | 9 | 9 | 18 |
| 3.9 | 9 | 9 | 27 |
| 3.10 | 10 | 10 | 10 |
| 3.11 | 10 | 10 | 20 |
| 3.12 | 10 | 10 | 30 |
| 3.13 | 12.5 | 12.5 | 12.5 |
| 3.14 | 12.5 | 12.5 | 25 |
| 3.15 | 12.5 | 12.5 | 37.5 |
| 3.16 | 14 | 14 | 14 |
| 3.17 | 14 | 14 | 28 |
| 3.18 | 14 | 14 | 42 |
| 3.19 | 16 | 16 | 16 |
| 3.20 | 16 | 16 | 32 |
| 3.21 | 16 | 16 | 48 |
| 3.22 | 18 | 18 | 18 |
| 3.23 | 18 | 18 | 36 |
| 3.24 | 18 | 18 | 54 |
| 3.25 | 20 | 20 | 20 |
| 3.26 | 20 | 20 | 40 |
| 3.27 | 20 | 20 | 60 |
| 3.28 | 22.5 | 22.5 | 22.5 |
| 3.29 | 22.5 | 22.5 | 45 |
| 3.30 | 22.5 | 22.5 | 67.5 |
| 3.31 | 25 | 25 | 25 |
| 3.32 | 25 | 25 | 50 |
| 3.33 | 25 | 25 | 75 |
| 3.34 | 27.5 | 27.5 | 27.5 |
| 3.35 | 27.5 | 27.5 | 55 |
| 3.36 | 27.5 | 27.5 | 82.5 |
| 3.37 | 30 | 30 | 30 |
| 3.38 | 30 | 30 | 60 |
| 3.39 | 30 | 30 | 90 |
| 3.40 | 34 | 34 | 34 |
| 3.41 | 34 | 34 | 68 |
| 3.42 | 34 | 34 | 102 |
| 3.43 | 37.5 | 37.5 | 37.5 |
| 3.44 | 37.5 | 37.5 | 75 |
| 3.45 | 37.5 | 37.5 | 112.5 |

In the present method and present compositions, preferably in binary compositions, the weight ratio of herbicide A to trifludimoxazin is generally in the range of from 5:1 to 1:5, preferably in the range of from 3:1 to 1:3, particularly preferably 2:1 to 1:2.

In another embodiment of the present method and present compositions, preferably in binary compositions, the weight ratio of herbicide A to trifludimoxazin is 2:1, 1:1 or 1:2,
preferably 2:1 or 1:1,
more preferably 2:1;
particularly preferably 1.5:1;
also preferably 1:1 or 1:2;
more preferably 1:1;
also preferably 2:1 or 1:2;
more preferably 1:2,
particularly preferably 1:1.5.

In the present method and present compositions, preferably in ternary compositions, the weight ratio of herbicide A to saflufenacil is generally in the range of from 5:1 to 1:5,
preferably in the range of from 3:1 to 1:3,
particularly preferably 2:1 to 1:2.

In another embodiment of the present method and present compositions, preferably in ternary compositions, the weight ratio of herbicide A to saflufenacil is 2:1, 1:1 or 1:2,
preferably 2:1 or 1:1,
more preferably 2:1;
particularly preferably 1.5:1;
also preferably 1:1 or 1:2;
more preferably 1:1;
also preferably 2:1 or 1:2;
more preferably 1:2,
particularly preferably 1:1.5.

In another embodiment of the present method and present compositions, preferably in ternary compositions, the weight ratio of herbicide A to saflufenacil is in the range of from 4:1 to 1:4, preferably in the range of from 2.5:1 to 1:2.5,
particularly preferably 1.5:1 to 1:1.5

In another embodiment of the present method and present compositions, preferably in ternary compositions, the weight ratio of herbicide A to saflufenacil is 4:1, 2.5:1, 1.5:1, 1.1:1, 1:1.1, 1:1.5, 1:2.5 or 1:4,
preferably 2.5:1, 1.5:1 or 1.1:1,
more preferably 1.1:1;
also more preferably 1.5:1;
also preferably 1:1.1, 1:1.5, 1:2.5 or 1:4,
more preferably 1:1.1;
also more preferably 1:1.5;
also more preferably 1:2.5.

In the present method and present compositions, preferably in ternary compositions, the weight ratio of herbicide A to trifludimoxazin to saflufenacil is
generally in the range of from 5:1:1 to 1:5:5, 1:1:5 to 5:5:1 or 1:5:1 to 5:1:5,
preferably in the range of from 3:1:1 to 1:3:3, 1:1:3 to 3:3:1 or 1:3:1 to 3:1:3,
in particular in the range of from 2:1:1 to 1:2:2, 1:1:2 to 2:2:1 or 1:2:1 to 2:1:2,
more preferably 2:1:1, 1.5:1:1, 1:2:1, 1:1.5:1, 1:1:1, 1:1.5 or 1:1:2;
especially preferably 1:1:1, 2:1:2, 3:1:2 or 1:1:2.

In another embodiment of the present method and present compositions, preferably in ternary compositions, the weight ratio of herbicide A to trifludimoxazin to saflufenacil is 2:1:1, 1.5:1:1, 1:2:1, 1:1.5:1, 1:1:1, 1:1:2, 1:1:1.5, 2:1:2, 1.5:1:1.5, 1:2:2, 1:1.5:1.5, 2:2:1 or 1.5:1.5:1,
preferably 2:1:1 or 1:1:1;
more preferably 2:1:1;
also preferably 1:1:1 or 1:1:2;
more preferably 1:1:1;

also preferably 2:1:1, 2:1:2 or 1:1:2;
more preferably 2:1:2;
also more preferably 1:1:2.

In another embodiment of the present method and present compositions, preferably in ternary compositions, the weight ratio of herbicide A to trifludimoxazin to saflufenacil is 1:1:1, 1:1:2, 1:1:3, 2:1:2, 2:1:3 or 2:1:4.

In another embodiment of the present method and present compositions, preferably in ternary compositions, the weight ratio of herbicide A to trifludimoxazin to saflufenacil is 1:1:1, 1:1:1.5, 1:1:2, 1:1:2.5, 1:1:3, 1.5:1:1.5, 1.5:1:2, 1.5:1:2.5, 1.5:1:3, 1.5:1:4, 1.5:1:4.5, 2:1:2, 2:1:3, 2:1:4, 2:1:5, 2:1:6, 2.5:1:2.5 or 3:1:3,
preferably 1:1:1.5, 1:1:2.5 or 1:1:3;
more preferably 1:1:3;
also preferably 1.5:1:1.5, 2.5:1:2.5 or 3:1:3,
also preferably 2:1:3, 2:1:4, 2:1:5 or 2:1:6,
more preferably 2:1:4.

The compositions according to the invention are suitable as herbicides. They are suitable as such or as an appropriately formulated composition (agrochemical composition).

The methods and compositions according to the invention have an outstanding herbicidal activity against undesired vegetation, i.e. against a large variety of unwanted plants, including monocotyledonous weeds and dicotyledonous weeds and comprising also volunteer crop plants as defined above.

The methods and compositions according to the invention are useful for controlling a large variety of unwanted plants (undesired vegetation), in particular for controlling weeds, which are selected from the genera *Abutilon, Ageratum, Alisma, Alopecurus, Amaranthus, Ambrosia, Ammania, Ammi, Amsinckia, Andropogon, Aneilema, Anthemis, Apera, Atriplex, Avena, Axonopis, Barbarea, Bidens, Borreria, Brachiaria, Brassica, Bromus, Bunias, Butomus, Calandrinia, Capsella, Cardamine, Cenchrus, Centaurea, Chenopodium, Cirsium, Conium, Convolvolus, Conyza, Coronopus, Cyclospermum, Cyperus, Datura, Daucus, Descurainia, Digitaria, Echinochloa, Eleusine, Epilobium, Epimedium, Eragrostis, Erigeron, Eriochloa, Erodium, Euphorbia, Fumaria, Galinsoga, Galium, Geranium, Gnaphalium, Helianthus, Heliotropium, Heteranthera, Hibiscus, Hordeum, Hypochaeris, Ipomoea, Kochia, Lactuca, Lamium, Leersia, Leptochloa, Lolium, Lycopsis, Malva, Marchantia, Matricaria, Mediago, Melinus, Mercurialis, Mollugo, Oenothera, Orobanche, Oryza, Oxalis, Panicum, Papaver, Pennisetum, Picris, Plantago, Poa, Polygonum, Portulaca, Raphanus, Ricardia, Salsola, Scirpus, Senecio, Sesbania, Setaria, Sida, Sinapis, Sisymbrium, Solanum, Sonchus, Sorghum, Stachys, Stellaria, Taraxacum, Thlaspi, Tribulus, Trifolium, Triticum, Urtica, Veronica, Vicia, Viola,* and *Xanthium.*

Mentioned below are some representatives of monocotyledonous and dicotyledonous weeds, which can be controlled by the compositions according to the invention without the enumeration being a restriction to certain species.

Preferably the methods and compositions according to the invention are used to control monocotyledonous weeds.

Examples of monocotyledonous weeds on which the methods and compositions according to the invention act efficiently are selected from the genera *Alopecurus* spp., *Avena* spp., *Brachiaria* spp., *Bromus* spp., *Cenchrus* spp., *Chloris* spp., *Commelina* spp., *Cyperus* spp., *Digitaria* spp., *Echinochloa* spp., *Eleusine* spp., *Eragrostis* spp., *Eriochloa* spp., *Hordeum* spp., *Leptochloa* spp., *Lolium* spp., *Panicum* spp., *Pennisetum* spp., *Poa* spp., *Setaria* spp., and *Sorghum* spp.

Preferred examples of monocotyledonous weeds on which the methods and compositions according to the invention act efficiently are selected from the genera *Avena* spp., *Brachiaria* spp., *Commelina* ssp., *Cyperus* spp., *Digitaria* spp., *Echinochloa* spp., *Hordeum* spp., *Lolium* ssp., *Setaria* spp. and *Sorghum* spp.

Preferred examples of monocotyledonous weeds on which the methods and compositions according to the invention act efficiently are selected from the species *Avena fatua, Avena sativa, Avena sterilis, Brachiaria decumbens, Brachiaria plantaginea, Brachiaria platyphylla, Bromus diandrus, Bromus rigidus, Bromus rubens* L., *Bromus secalinus, Bromus sterilis, Cenchrus echinatus, Chloris virgata, Commelina benghalensis, Cynodon dactylon, Cyperus compressus, Cyperus esculentes, Cyperus iria, Cyperus kylingia, Cyperus rotundus, Digitaria horizontalis, Digitaria insularis, Digitaria ischaemum, Digitaria sanguinalis, Echinochloa colonum, Echinochloa crus-galli, Eleusine indica, Eragrostis pectinacea, Eriochloa gracilis, Leptochloa fusca, Lolium multiflorum, Lolium perenne, Lolium rigidum, Ottochloa nodosa, Panicum maximum, Panicum miliaceum, Pennisetum glaucum, Poa annua, Setaria faberi, Setaria italica, Setaria lutescens, Setaria palmifolia, Setaria verticillata, Setaria viridis, Sorghum halepense* and *Urochloa paricoides.*

Especially preferred examples of monocotyledonous weeds on which the methods and compositions according to the invention act efficiently are selected from the species *Avena* spp., *Brachiaria* spp., *Bromus* spp., *Commelina* spp., *Digitaria* spp., *Echinochloa* spp., *Eleusine* spp., *Lolium* spp., *Setaria* spp. and *Sorghum* spp.

Also especially preferred examples of monocotyledonous weeds on which the methods and compositions according to the invention act efficiently are selected from *Avena fatua, Brachiaria decumbens, Commelina benghalensis, Cyperus iria, Digitaria sanguinales, Echinocloa crusgalli, Hordeum vulgare, Lolium multiflorum, Setaria faberi, Setaria viridis* and *Sorghum vulgare.*

More preferably the methods and compositions according to the invention are used to control commelinids. In plant taxonomy, "commelinids" (originally commelinoids) are a clade of flowering plants within the monocotyledons (commonly referred to as "monocots").

Particularly preferred the methods and compositions according to the invention are used to control unwanted plants selected from the families of Commelinaceae, Cyperaceae and Poaceae.

According to another embodiment, the methods and compositions of the present invention are suitable for controlling monocotyledonous weeds, which are selected from the family Commelinaceae.

Examples for Commelinaceae are *Commelina benghalensis, Commelina communis, Commelina diffusa, Commelina latifolia* and *Commelina virginica.*

Preferably the methods and compositions according to the invention are used to control Commelinaceae selected from *Commelina benghalensis* and *Commelina latifolia.*

According to another embodiment, the methods and compositions of the present invention are suitable for controlling monocotyledonous weeds, which are selected from the family Cyperaceae.

Examples for Cyperaceae are *Cyperus compressus, Cyperus difformis, Cyperus esculentes, Cyperus ferax, Cyperus*

*iria, Cyperuls kylingia, Cyperus malaccensis, Cyperus rotundus* and *Cyperus serotinus*.

Preferably the methods and compositions according to the invention are used to control Cyperaceae selected from *Cyperus esculentes, Cyperus iria, Cyperuls kylingia*, and *Cyperus rotundus*.

According to another embodiment, the methods and compositions of the present invention are suitable for controlling monocotyledonous weeds, which are selected from the family Poaceae (Gramineae), commonly known as grasses.

Examples for Poaceae are *Avena fatua, Avena sativa, Avena sterilis, Brachiaria decumbens, Brachiaria plantaginea, Brachiaria platyphylla, Bromus diandrus, Bromus rigidus, Bromus rubens, Bromus secalinus, Bromus sterilis, Cenchrus echinatus, Digitaria horizontalis, Digitaria insularis, Digitaria ischaemum, Digitaria sanguinalis, Echinochloa crus-galli, Echinochloa colonum, Eleusine indica, Eragrostis pectinacea, Eriochloa gracilis, Leptochloa fusca, Lolium multiflorum, Lolium perenne, Lolium rigidum, Panicum miliaceum, Panicum maximum, Pennisetum glaucum, Poa annua, Setaria faberi, Setaria italica, Setaria lutescens, Setaria verticillata, Setaria viridis* and *Sorghum halepense*.

Preferably the methods and compositions according to the invention are used to control Poaceae selected from *Avena fatua, Avena sativa, Avena sterilis, Brachiaria decumbens, Brachiaria plantaginea, Brachiaria platyphylla, Bromus rigidus, Bromus secalinus, Digitaria horizontalis, Digitaria insularis, Digitaria ischaemum, Digitaria sanguinalis, Echinochloa crusgalli, Echinochloa colonum, Eleusine indica, Lolium multiflorum, Lolium perenne, Lolium rigidum, Setaria faberi, Setaria italica, Setaria lutescens, Setaria verticillate* and *Setaria viridis*.

Preferred examples of commelinids, on which the methods and compositions according to the invention act efficiently, are selected from the genera *Avena* spp., *Brachiaria* spp., *Commelina* ssp., *Cyperus* spp., *Digitaria* spp., *Echinochloa* spp., *Lolium* ssp., *Setaria* spp. and *Sorghum* spp.

Preferred examples of Commelinaceae, Cyperaceae and Poaceae, on which the methods and compositions according to the invention act efficiently, are selected from *Avena* spp., *Brachiaria* spp, *Commelina* spp., *Digitaria* spp., *Echinochloa* spp., *Eleusine* spp., *Lolium* spp. and *Setaria* spp.

According to another embodiment, the methods and compositions according to the invention are used to control dicotyledonous weeds, commonly known as broadleaf weeds.

Examples of dicotyledonous weeds on which the methods and compositions according to the invention act efficiently are selected from the genera *Abutilon* spp., *Ageratum* spp., *Alternathera* spp., *Amaranthus* spp., *Ambrosia* spp., *Amsinckia* spp., *Andropogon* spp., *Asystasia* spp, *Axonopus* spp, *Bidens* spp., *Borreria* spp. (*Spermacoce* spp.), *Brassica* spp., *Calandrinia* spp., *Capsella* spp., *Cardamine* spp., *Cenchrus* spp., *Chenopodium* spp., *Cirsium* spp., *Cleome* spp., *Conyza* spp., *Coronopus* spp., *Cyclospermum* spp., *Datura* spp., *Epilobium* spp., *Epimedium* spp., *Eragrostis* spp., *Erigeron* spp., *Erodium* spp., *Euphorbia* spp., *Galium* spp., *Galinsoga* spp., *Gnaphalium* spp., *Helianthus* spp., *Hypochaeris* spp., *Ipomoea* spp., *Kochia* spp., *Lactuca* spp., *Lamium* spp., *Malva* spp., *Marchantia* spp., *Matricaria* spp., *Medicago* spp., *Mollugo* spp., *Mucuna* spp, *Nicotiana* spp., *Oenothera* spp., *Oxalis* spp., *Paspalum* spp., *Phylanthus* spp, *Picris* spp., *Plantago* spp., *Polygonum* spp., *Portulaca* spp., *Raphanus* spp., *Richardia* spp., *Salsola* spp., *Senecio* spp., *Sesbania* spp., *Sida* spp, *Sinapis* spp., *Sisymbrium* spp., *Solanum* spp., *Sonchus* spp., *Stellaria* spp., *Stenochlaena* spp., *Taraxacum* spp., *Tribulus* spp., *Trifolium* spp., *Urtica* spp., *Veronica* spp. and *Vicia* spp.

Preferred examples of dicotyledonous weeds on which the methods and compositions according to the invention act efficiently are selected from the genera *Abutilon* ssp., *Amaranthus* spp., *Erigeron* spp. and *Kochia* spp.

Preferred examples of dicotyledonous weeds on which the methods and compositions according to the invention act efficiently are selected from the species *Abutilon theophrasti, Ageratum conycoides, Ambrosia artemisiifolia, Ambrosia elatior, Andropogon bicornis, Amaranthus blitoides, Amaranthus chlorostachys, Amaranthus hybridus, Amaranthus lividus, Amaranthus palmeri, Amaranthus rudis, Amaranthus retroflexus, Amaranthus spinosus, Amaranthus tamariscina, Amaranthus tuberculatos, Bidens bipinnata, Bidens pilosa, Borreria latifolia* (*Spermacoce latifolia*), *Borreria verticilata* (*Spermacoce verticilata*), *Brassica nigra, Brassica rapa, Brassica napus, Capsella bursa-pastoris, Chenopodium album, Circium arvense, Epimedium* spp., *Erigeron bonariensis* (*Conyza bonariensis*), *Erigeron canadensis, Euphorbia heterophylla, Euphorbia maculate, Galium* aparine, *Galium spurium, Galinsoga* spp., *Helianthus annuus, Ipomoea grandifolia, Ipomoea hederacea, Ipomoea lacunosa, Kochia scoparia, Lactuca serriola, Lamium amplexicaule, Malva* parviflora, *Malva neglecta, Marchantia* spp., *Matricaria matriccarioides, Oxalis* spp., *Plantago* spp., *Polygonum aviculare, Polygonum convolvulus, Portulaca oleracea, Raphanus raphanistrum, Richardia scabra, Senecio vulgaris, Sesbania exaltata, Sida spinosa, Sinapis arvensis, Solanum* spp., *Sonchus oleraceus, Stellaria media, Trifolium* spp., *Veronica* spp. and *Vicia benghalensis*.

Especially preferred examples of dicotyledonous weeds on which the methods and compositions according to the invention act efficiently are selected from the species *Abutilon* spp., *Amaranthus* spp., *Ambrosia* spp., *Bidens* spp., *Borreria* spp. (*Spermacoce* spp.), *Chenopodium* spp., *Conyza* spp., *Erigeron* spp., *Euphorbia* spp., *Galium* spp., *Ipomoea* spp., *Kochia* spp., *Polygonum* spp., *Portulaca* spp. and *Raphanus* spp.

Most preferred examples of dicotyledonous weeds on which the methods and compositions according to the invention act efficiently are selected from *Amaranthus* spp., *Ambrosia* spp., *Borreria* spp. (*Spermacoce* spp.), *Chenopodium* spp., *Conyza* spp., *Erigeron* spp., *Galium* spp., *Ipomoea* spp. and *Kochia* spp.

According to another embodiment, the methods and compositions of the present invention are suitable for controlling undesired vegetation, wherein the undesired vegetation comprises volunteer crop plants. Volunteer crop plants are crop plants that volunteer in planted crops. They (the volunteer crops) are considered weeds, which compete with the planted crop for moisture, nutrients, and light.

In the methods of the present invention, volunteer crop plants are preferably crop plants expressing a protoporphyrinogen oxidase enzyme (PPO), which PPO had not been rendered herbicide-tolerant (or -resistant) by mutagenesis or recombinant genetic engineering techniques as described herein.

According to a further preferred embodiment, the compositions and methods of the present invention are suitable for controlling undesired vegetation, wherein the undesired vegetation comprises volunteer crop plants selected from the genera *Brassica, Glycine, Gossypium, Hordeum, Triticum* and *Zea;* in particular from the species *Brassica napus* (BRSNW, BRSNS), *Glycine max* (GLXMA), *Gossypium hirsu-*

*tum* (GOSHI), *Hordeum vulgare* (HORVW, HORVS), *Triticum aestivum* (TRZAW, TRZAS), *Zea mays* (ZEAMX).

More preferred the compositions and methods of the present invention are suitable for controlling volunteer crop plants selected from corn, soy, cotton, wheat and canola.

Preferably the methods and compositions according to the invention are used to control monocotyledonous weeds, wherein the weeds to be controlled are monocotyledonous weeds including respective volunteer crop plants.

According to a preferred embodiment, the methods and compositions of the present invention are suitable for controlling monocotyledonous weeds and crop volunteers, which are selected from the genera *Avena, Brachiaria, Bromus, Digitaria, Echinocloa, Eleusine, Hordeum, Lolium, Poa, Setaria, Triticum* and *Zea;* in particular from the species *Avena fatua* (AVEFA), *Avena sativa* (AVESA), *Avena sterilis* (AVEST), *Brachiaria decumbens* (BRADC), *Brachiaria plantaginea* (BRAPL), *Brachiaria platyphylla* (BRAPP), *Bromus scoparius* (BROSC), *Bromus sterilis* (BROST), *Bromus tectorum* (BROTE), *Bromus rigidus* (BRORI), *Bromus secalinus* (BROSE), *Digitaria sanguinalis* (DIGSA), *Digitaria insularis* (DIGIN or TRCIN), *Digitaria horizontalis* (DIGHO), *Digitaria ischaemum* (DIGIS), *Echinochloa crus-galli* (ECHCG), *Echinochloa colonum* (ECHCO), *Eleusine indica* (ELEIN), *Hordeum vulgare* (HORVW, HORVS), *Lolium multiflorum* (LOLMU), *Lolium rigidum* (LOLRI), *Poa annua* (POAAN), *Poa trivialis* (POATR), *Setaria faberi* (SETFA), *Setaria italica* (SETIT), *Setaria lutescens* (SETLU), *Setaria viridis* (SETVI), *Setaria verticillate* (SETVE), *Triticum aestivum* (TRZAW, TRZAS) and *Zea mays* (ZEAMX).

According to a more preferred embodiment, the methods and compositions of the present invention are suitable for controlling monocotyledonous weeds and crop volunteers, which are selected from the genera *Avena, Brachiaria, Digitaria, Echinocloa, Eleusine, Hordeum, Setaria, Triticum* and *Zea;* in particular from the species *Avena fatua* (AVEFA), *Avena sativa* (AVESA), *Avena sterilis* (AVEST), *Brachiaria decumbens* (BRADC), *Brachiaria plantaginea* (BRAPL), *Brachiaria platyphylla* (BRAPP), *Digitaria sanguinalis* (DIGSA), *Digitaria insularis* (DIGIN or TRCIN), *Digitaria horizontalis* (DIGHO), *Digitaria ischaemum* (DIGIS), *Echinochloa crus-galli* (ECHCG), *Echinochloa colonum* (ECHCO), *Eleusine indica* (ELEIN), *Hordeum vulgare* (HORVW, HORVS), *Setaria faberi* (SETFA), *Setaria italica* (SETIT), *Setaria lutescens* (SETLU), *Setaria viridis* (SETVI), *Setaria verticillate* (SETVE), *Triticum aestivum* (TRZAW, TRZAS) and *Zea mays* (ZEAMX).

In the methods and compositions of the present invention, the herbicide A, trifludimoxazin and optionally saflufenacil can be formulated and applied jointly or separately, during or after the emergence of the unwanted plants.

In case of separate application, the order of the application of herbicide A, trifludimoxazin and optionally saflufenacil is of minor importance. The only thing important is that the herbicide A, trifludimoxazin and optionally saflufenacil are present simultaneously at the site of action.

In a preferred embodiment of the methods and compositions of the present invention, the herbicide A, trifludimoxazin and optionally saflufenacil are applied jointly.

In another preferred embodiment of the methods and compositions of the present invention, the herbicide A, trifludimoxazin, and optionally saflufenacil are formulated and applied jointly.

In another preferred embodiment of the methods and compositions of the present invention, the herbicide A, trifludimoxazin, and optionally saflufenacil, are each formulated separately, but applied jointly.

In another preferred embodiment of the methods and compositions of the present invention, the herbicide A and trifludimoxazin are applied jointly, and optionally saflufenacil is applied separately.

In another preferred embodiment of the methods and compositions of the present invention, the herbicide A and trifludimoxazin are applied jointly, and saflufenacil is applied separately.

In another preferred embodiment of the methods and compositions of the present invention, the herbicide A and trifludimoxazin are formulated and applied jointly, and optionally saflufenacil is formulated and applied separately.

In another preferred embodiment of the methods and compositions of the present invention, the herbicide A and trifludimoxazin are formulated and applied jointly, and saflufenacil is formulated and applied separately.

In another preferred embodiment of the methods and compositions of the present invention, the herbicide A and trifludimoxazin are formulated jointly, and saflufenacil is formulated separately and applied jointly with herbicide A and trifludimoxazin.

In another preferred embodiment of the methods and compositions of the present invention, the herbicide A and saflufenacil are applied jointly, and trifludimoxazin is applied separately.

In another preferred embodiment of the methods and compositions of the present invention, the herbicide A and saflufenacil are formulated and applied jointly, and trifludimoxazin is formulated and applied separately.

In another preferred embodiment of the methods and compositions of the present invention, the herbicide A and saflufenacil are formulated jointly, and trifludimoxazin is formulated separately and applied jointly with herbicide A and saflufenacil.

In another preferred embodiment of the methods and compositions of the present invention, trifludimoxazin and saflufenacil are applied jointly, and the herbicide A is applied separately.

In another preferred embodiment of the methods and compositions of the present invention, trifludimoxazin and saflufenacil are formulated and applied jointly, and the herbicide A is formulated and applied separately.

In another preferred embodiment of the methods and compositions of the present invention, trifludimoxazin and saflufenacil are formulated jointly, and the herbicide A is formulated separately and applied jointly with trifludimoxazin and saflufenacil.

In another preferred embodiment of the methods and compositions of the present invention, the herbicide A, trifludimoxazin, and optionally saflufenacil are applied separately.

In another embodiment of the methods and compositions of the present invention, the herbicide A, trifludimoxazin and optionally saflufenacil are formulated and applied separately.

Application of the compositions according to the present invention can be done during and/or after, preferably after the emergence of the unwanted plants.

It is particularly advantageous to apply the compositions according to the invention post emergent when the undesired plant starts emerging from the ground up to flowering.

The methods and compositions of the present invention can generally be applied to weeds at any growth with good results.

The methods and compositions of the present invention can generally be applied to weeds, which are several cm tall,
for example the weeds can be between 1 and 80 cm tall;
preferably the weeds are between 2 and 60 cm tall;
more preferred the weeds are between 3 and 30 cm tall.

In one embodiment, the methods and compositions comprising herbicide A and saflufenacil are applied to weeds, which are more than 1 cm tall.

In one embodiment, the methods and compositions comprising herbicide A and saflufenacil are applied to weeds, which are more than 2 cm tall.

In one embodiment, the methods and compositions comprising herbicide A, trifludimoxazin and optionally saflufenacil are applied to weeds, which are more than 3 cm tall.

In another embodiment, the methods and compositions comprising herbicide A, trifludimoxazin and optionally saflufenacil are applied to weeds, which are more than 5 cm tall.

In another embodiment, the methods and compositions comprising herbicide A, trifludimoxazin and optionally saflufenacil are applied to weeds, which are more than 8 cm tall.

As an alternative and commonly known, the growth of plants can also be defined by the respective growth stage (GS) according to BBCH (Biologische Bundesanstalt für Land-und Forstwirtschaft, Bundessortenamt und CHemische Industrie), see e.g. U. Meier, Growth stages of mono- and dicotyledonous plants, January 2001.

The methods and compositions of the present invention can generally be applied to weeds, which are in the following growth stages (GS):
for example the weeds can be between GS11 and GS69;
preferably the weeds are between GS12 and GS61;
more preferred the weeds are between GS12 and GS39.
particularly preferred the weeds are between GS13 and GS34.

The methods and composition according to the invention can be applied in conventional manner by using techniques a skilled person is familiar with. Suitable techniques include spraying, atomizing, dusting, spreading or watering. The type of application depends on the intended purpose in a well-known manner; in any case, it should ensure the finest possible distribution of the active ingredients.

The methods and compositions according to the invention are applied to the plants mainly by spraying the leaves. Here, the application can be carried out using, for example, water as carrier by customary spraying techniques using spray liquor amounts of from about 10 to 1000 l/ha (for example from 300 to 400 l/ha).

The herbicidal compositions may also be applied by the low-volume or the ultra-low-volume method, or in the form of microgranules.

The methods and compositions of the invention may be applied in combination with, or by utilizing smart agricultural technologies, such as precision agriculture, remote and proximate imaging and image recognition, or smart agricultural site management programs. These smart agricultural technologies typically include models, e.g. computer programs, that support the user by considering information from a wide variety of sources to increase the quality and yield of harvested material, reduce damage by pests including the prediction of pest pressure and smart application of crop protection products, secure environmental protection, support quick and reliable agronomic decision making, reduce usage of fertilizers and crop protection products, reduce product residues in consumables increase spatial and temporal precision of agronomical measures, automate processes, and enable traceability of measures.

Commercially available systems which include agronomic models are e.g. FieldScripts™ from The Climate Corporation, Xarvio™ from BASF, AGLogic™ from John Deere, etc.

Information input for these models include but is not limited to soil data (e.g. pH, organic matter content, moisture level, nutrient content such as nitrogen, potassium, phosphorous and micro-nutrient content); information on the plants that are currently growing or that may grow at the area of interest including crop plants and/or weeds (e.g. type of plant, chlorophyl levels, biomass, growth stage, plant health, plant water status, plant growth models, genetic traits, biotic damage by infestation or infection with pests, abiotic damage as caused by drought or nutrient stress etc.); weather information (e.g. information on past and present, and forecast of future temperature, humidity, and/or precipitation); information on the location of the area and directly derivable information thereof (e.g. terrain features like altitude, slope, water bodies, sun exposure and hours of sunshine per day, vegetation period, etc.); information on pest pressure (e.g. information of the past or present occurrence of unwanted vegetation, fungal diseases and invertebrate pests at the area of interest, at neighboring areas, the region, or the vegetation zone); information on beneficial organisms (e.g. information of the past or present occurrence of beneficial organisms at the area of interest, at neighboring areas, the region, or the vegetation zone); and/or historic information of any of the aforementioned (e.g. information on previous seasons, or of an earlier point in time of the same season).

The information usable for precision agriculture may be based on input by at least one user, be accessible from external data sources and databases, or be based on sensor data. Data sources typically include proximate-detection systems like soil-borne sensors and remote sensing as may be achieved by imaging with unmanned airborne vehicles like drones, or satellites. Imaging technologies includes poly- and multispectral imagery in the UV-VIS, NIR and UV spectrum. Sensors may be included in an Internet-of-Things system and may be directly or indirectly connected to the processing unit, e.g. via a wireless network and/or cloud applications. The information is typically taken into account by at least one processing unit and used to provide recommendations, generate control signals (e.g. for the control of agricultural machinery like tractors, drones, irrigation systems, farm management systems and the like), and/or generate (digital) maps on the area of interest. These (digital) maps contain spatially and optionally temporally resolved information of the agricultural site, wherein the information may contain information directly gathered as described above, combinations thereof or derived thereof, such as pest pressure, nutrient levels, and the like. The recommendations, control signals and (digital) maps may relate to or be used for controlling the application of water, nutrients, agrochemical products, or plant propagation material to the field of interest, or for taking other management measures like tilling, physical or laser-induced weeding.

Typical technologies that are used in smart agricultural technologies include self-steering robots (such as tractors, harvesters, drones), artificial intelligence (e.g. machine learning), imaging technologies (e.g. image segmentation technologies), big data analysis, and model generation, cloud computing, and machine-to-machine communication.

Precision agriculture such as precision farming is characterized by spatially and/or temporally resolved, targeted application of active ingredients like pesticides, preferably the compositions according to the present invention, plant-growth-regulators, fertilizers, and/or water including the variation of application rates over the agronomic site, zone or spot application, and of the spatially and/or temporally resolved, targeted planting or seeding of desired plant propagation material to a agronomic site. Precision farming typically includes the use of geo-positioning technologies like GPS for gaining information on the location and boundaries of the area of interest, the utilized application equipment, sensing equipment and recorded data, and to control the actions of farm vehicles such as spraying. By combining geo-positioning data with (digital) maps, it is possible to (semi)-automate agricultural measures at the site of interest, e.g. by using (semi)-autonomous spraying or seeding equipment.

Precision farming may typically include the application of smart spraying equipment, e.g. spot spraying, and precision spraying at a farm, e.g. by irrigation systems, tractors, robots, helicopters, airplanes, unmanned aerial vehicles, such as drones. Such equipment usually includes input sensors (such as e.g. a camera) and a processing unit configured to analyze the input data and configured to provide a recommendation or decision based on the analysis of the input data to apply the compositions of the invention to the agronomic site, e.g. the soil or to control pests in a specific and precise manner.

For example, weeds may be detected, identified, and/or classified from imagery acquired by a camera. Such identification and/or classification can make use of image processing algorithms, which may utilize artificial intelligence (e.g. machine learning algorithms), or decision trees.

In this manner, the methods and compositions described herein can be applied only at the required location, point in time and dose rate.

The methods and compositions of the invention can be applied together with the seed of a crop plant, or within a crop plant cultivation site.

If herbicide A, trifludimoxazin and optionally saflufenacil are less well tolerated by certain crop plants, application techniques may be used in which the herbicidal compositions are sprayed, with the aid of the spraying equipment, in such a way that as far as possible they do not come into contact with the leaves of the sensitive crop plants, while they reach the leaves of unwanted plants growing underneath, or the bare soil surface (post-directed, lay-by).

When the methods and composition of the invention comprising herbicide A as component A, trifludimoxazin as component B, and optionally saflufenacil as component C are used in burndown programs, they can be applied prior to seeding (planting) or after seeding (planting) of the crop plants, but before the emergence of the crop plants.

In the methods and composition of the invention, preferred crops for burndown programs are soybeans, lentils, peas, beans, corn, cotton, trees, coffee, tea, rice, vegetables, canola and cereals.

Depending on the application method in question, the methods and compositions according to the invention can be employed in a further number of crop plants for eliminating unwanted plants.

According to the invention all the crop plants (cultivated plants) mentioned herein are understood to comprise all species, subspecies, variants and/or hybrids which belong to the respective cultivated plants, including but not limited to winter and spring varieties, in particular in cereals such as wheat and barley, as well as oilseed rape, e.g. winter wheat, spring wheat, winter barley etc.

For example, corn is also known as Indian corn or maize (*Zea mays*) which comprises all kinds of corn such as field corn and sweet corn. According to the invention all maize or corn subspecies and/or varieties are comprised, in particular flour corn (*Zea mays* var. *amylacea*), popcorn (*Zea mays* var. *everta*), dent corn (*Zea mays* var. *indentata*), flint corn (*Zea mays* var. *indurata*), sweet corn (*Zea mays* var. *saccharata* and var. *rugosa*), waxy corn (*Zea mays* var. *ceratina*), amylomaize (high amylose *Zea mays* varieties), pod corn or wild maize (*Zea mays* var. *tunicata*) and striped maize (*Zea mays* var. *japonica*).

Further, most soybean cultivars are classifiable into indeterminate and determinate growth habit, whereas *Glycine soja*, the wild progenitor of soybean, is indeterminate (PNAS 2010, 107 (19) 8563-856). The indeterminate growth habit (Maturity Group, MG 00 to MG 4.9) is characterized by a continuation of vegetative growth after flowering begins whereas determinate soybean varieties (Maturity Group, (MG) 5 to MG 8) characteristically have finished most of their vegetative growth when flowering begins. According to the invention all soybean cultivars or varieties are comprised, in particular indeterminate and determinate cultivars or varieties.

Examples of suitable crops are the following:

*Allium cepa, Ananas comosus, Arachis hypogaea, Asparagus officinalis, Avena sativa, Beta vulgaris* spec. *altissima, Beta vulgaris* spec. *rapa, Brassica napus* var. *napus, Brassica napus* var. *napobrassica, Brassica rapa* var. *silvestris, Brassica oleracea, Brassica nigra, Camellia sinensis, Carthamus tinctorius, Carya illinoinensis, Citrus limon, Citrus sinensis, Coffea arabica* (*Coffea canephora, Coffea liberica*), *Cucumis sativus, Cynodon dactylon, Daucus carota, Elaeis guineensis, Fragaria vesca, Glycine max, Gossypium hirsutum,* (*Gossypium arboreum, Gossypium herbaceum, Gossypium vitifolium*), *Helianthus annuus, Hevea brasiliensis, Hordeum vulgare, Humulus lupulus, Ipomoea batatas, Juglans regia, Lens culinaris, Linum usitatissimum, Lycopersicon lycopersicum, Malus* spec., *Manihot esculenta, Medicago sativa, Musa* spec., *Nicotiana tabacum* (*N. rustica*), *Olea europaea, Oryza sativa, Phaseolus lunatus, Phaseolus vulgaris, Picea abies, Pinus* spec., *Pistacia vera, Pisum sativum, Prunus avium, Prunus persica, Pyrus communis, Prunus armeniaca, Prunus cerasus, Prunus dulcis* and *prunus domestica, Ribes sylvestre, Ricinus communis, Saccharum officinarum, Secale cereale, Sinapis alba, Solanum tuberosum, Sorghum bicolor* (s. *vulgare*), *Theobroma cacao, Trifolium pratense, Triticum aestivum, Triticale, Triticum durum, Vicia faba, Vitis vinifera, Zea mays.*

Preferred crops are *Arachis hypogaea, Beta vulgaris* spec. *altissima, Brassica napus* var. *napus, Brassica oleracea, Citrus limon, Citrus sinensis, Coffea arabica* (*Coffea canephora, Coffea liberica*), *Cynodon dactylon, Glycine max, Gossypium hirsutum,* (*Gossypium arboreum, Gossypium herbaceum, Gossypium vitifolium*), *Helianthus annuus, Hordeum vulgare, Juglans regia, Lens culinaris, Linum usitatissimum, Lycopersicon lycopersicum, Malus* spec., *Medicago sativa, Nicotiana tabacum* (*N. rustica*), *Olea europaea,*

*Oryza sativa, Phaseolus lunatus, Phaseolus vulgaris, Pistacia vera, Pisum sativum, Prunus dulcis, Saccharum officinarum, Secale cereale, Solanum tuberosum, Sorghum bicolor* (s. *vulgare*), *Triticale, Triticum aestivum, Triticum durum, Vicia faba, Vitis vinifera* and *Zea mays*.

Especially preferred crops are crops of cereals, corn, soybeans, lentils, peas, beans, rice, oilseed rape (canola), cotton, potatoes, peanuts or permanent crops.

Also especially preferred crops are corn, soybeans, lentils, peas, beans, rice, oilseed rape (canola), cotton and permanent crops.

The methods and compositions of the present invention are suitable for controlling weeds in fields, where the following crops will be or have been seeded or will be or have been cultivated, e.g.
- soybean (*Glycine max*);
- maize (corn; *Zea mays*);
- cotton (*Gossypium hirsutum, Gossypium arboreum, Gossypium herbaceum, Gossypium vitifolium*);
- rice (*Oryza* spp. such as *Oryza sativa* and *Oryza glaberrima*);
- canola (*Brassica napus*);
- permanent crops (*Citrus limon, Citrus sinensis, Elaeis quineensis*);
- lentils (*Lens culinaris*);
- peas (*Pisum sativum*); and
- beans (*Phaseolus vulgaris*), and
- wheat (*Triticum aestivum, Triticum durum*).

The methods and compositions of the present invention are also suitable for controlling weeds in fields, where the following crops will be or have been seeded or will be or have been cultivated, e.g.
- soybean (*Glycine max*);
- maize (corn; *Zea mays*);
- cotton (*Gossypium hirsutum, Gossypium arboreum, Gossypium herbaceum, Gossypium vitifolium*);
- rice (*Oryza* spp. such as *Oryza sativa* and *Oryza glaberrima*);
- canola (*Brassica napus*);
- permanent crops (e.g. *Citrus limon, Citrus sinensis, Elaeis guineensis*);
- lentils (*Lens culinaris*);
- peas (*Pisum sativum*); and
- beans (*Phaseolus vulgaris*).

In a preferred embodiment of the method according to present invention, an effective amount of a composition comprising herbicide A, trifludimoxazin and optionally saflufenacil is applied to the crop cultivation site, where soybean, maize, cotton, canola and citrus, will be or have been seeded or will be or is cultivated.

The methods and compositions according to the invention can also be used in crops, e.g. in the vicinity of crop plants, which herbicide tolerance has been modified, e.g. increased, by mutagenesis or genetic engineering to provide a new trait to a plant or to modify an already present trait.

The methods and compositions according to the invention can also be applied pre-plant, pre-emergent, at-emergent (i.e. crops at emergence at needle point or spiking) and/or post-emergent of crops, e.g. in the vicinity of crop plants, which herbicide tolerance has been modified, e.g. increased, by mutagenesis or genetic engineering to provide a new trait to a plant or to modify an already present trait.

Accordingly, the term "crops" as used herein includes also (crop) plants which have been modified by mutagenesis or genetic engineering in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, increased yield and tolerance to abiotic conditions, like drought.

Herbicide tolerance has been created by using mutagenesis as well as using genetic engineering. Plants which have been rendered tolerant to acetolactate synthase (ALS) inhibitor herbicides by conventional methods of mutagenesis and breeding comprise plant varieties commercially available under the name Clearfield®. However, most of the herbicide tolerance traits have been created via the use of transgenes.

The methods and compositions according to the invention can be applied at a cultivation site of a crop plant expressing a protoporphyrinogen oxidase enzyme (PPO), which PPO had been rendered herbicide-tolerant (or -resistant) by mutagenesis or recombinant genetic engineering techniques as described herein.

Preferably the methods and compositions according to the invention are applied to crop plants which have been rendered tolerant to PPO-inhibiting herbicides.

Also preferably the methods and compositions according to the invention are applied post-emergent to weeds in an area, where crop plants are grown or are to be grown, which have been rendered tolerant to PPO-inhibiting herbicides.

Also preferably the methods and compositions according to the invention are applied post-emergent to weeds in an area, where crop plants are grown or are to be grown, which have been rendered tolerant to PPO-inhibiting herbicides, and whereas such methods and compositions are applied pre-plant, pre-emergent, at-emergent (i.e. crops at emergence at needle point or spiking) and/or post-emergent to such crops.

Respective herbicide-tolerant PPO enzymes are well known to the person skilled in the art. Plants, e.g. crops, which tolerance to PPO-inhibiting herbicides had been increased by transforming said plants with nucleic acids encoding mutated PPO enzymes, are known e.g. from WO 2012/080975 and WO2015/022636.

Both, WO 2012/080975 as well as WO2015/022636 disclose plants, which tolerance to PPO inhibitors had been increased by transforming said plants with nucleic acids encoding mutated PPO enzymes, in which the Arginine corresponding to position 128, and the phenylalanine corresponding to position 420 of an *Amaranthus* type II PPO had been replaced.

WO 2013/189984 discloses plants the tolerance of which to PPO inhibitors had been increased by transforming said plants with nucleic acids encoding mutated PPO enzymes, in which the Leucine corresponding to position 397 of an *Amaranthus* type II PPO had been replaced, and the phenylalanine corresponding to position 420 of an *Amaranthus* type II PPO had been replaced. WO2015/092706 discloses PPO polypeptides from a plurality of organisms, which PPO polypeptides had been mutated to comprise the advantageous mutations employed for the *Amaranthus* type II PPO.

WO 2015/022640 discloses PPO polypeptides from *Alopecurus myosuroides* and mutants thereof, which confer tolerance to a broad spectrum of PPO inhibiting herbicides.

WO 2016/203377 describes PPO polypeptides from a plurality of organisms, which PPO polypeptides may have intrinsic inhibitor tolerance if, e.g., derived from a herbicide-tolerant microorganism. WO 2018/114759 discloses mutant PPO polypeptides bearing mutations in the non-active site, combined with target site mutations at positions described above.

Crops useful for the methods and compositions of the present invention include also those crops which have been subjected to further genetic modifications by breeding, mutagenesis or genetic engineering, e.g. have been rendered tolerant to applications of specific other classes of herbicides, either alone, or in addition to being tolerant to PPOi herbicides as mentioned above.

Herbicide tolerance has been created e.g. to glyphosate, glufosinate, 2,4-D, dicamba, oxynil herbicides, like bromoxynil and ioxynil, sulfonylurea herbicides, ALS inhibitor herbicides and 4-hydroxyphenyl-pyruvate dioxygenase (HPPD) inhibitors, like isoxaflutole and mesotrione.

Transgenes which have been used to provide herbicide tolerance traits comprise:
  for tolerance to glyphosate: cp4 epsps, epsps grg23ace5, mepsps, 2mepsps, gat4601, gat4621 and goxv247,
  for tolerance to glufosinate: pat and bar,
  for tolerance to 2,4-D: aad-1 and aad-12,
  for tolerance to dicamba: dmo,
  for tolerance to oxynil herbicies: bxn,
  for tolerance to sulfonylurea herbicides: zm-hra, csr1-2, gm-hra, S4-HrA,
  for tolerance to ALS inhibitor herbicides: csrl-2,
  for tolerance to HPPD inhibitor herbicides: hppdPF, W336 and avhppd-03.

Transgenic corn events comprising herbicide tolerance genes are for example, but not excluding others, DAS40278, MON801, MON802, MON809, MON810, MON832, MON87411, MON87419, MON87427, MON88017, MON89034, NK603, GA21, MZHGOJG, HCEM485, VCO-Ø1981-5, 676, 678, 680, 33121, 4114, 59122, 98140, Bt10, Bt176, CBH-351, DBT418, DLL25, MS3, MS6, MZIR098, T25, TC1507 and TC6275.

Transgenic soybean events comprising herbicide tolerance genes are for example, but not excluding others, GTS 40-3-2, MON87705, MON87708, MON87712, MON87769, MON89788, A2704-12, A2704-21, A5547-127, A5547-35, DP356043, DAS44406-6, DAS68416-4, DAS-81419-2, GU262, SYHTOH2, W62, W98, FG72 and CV127.

Transgenic cotton events comprising herbicide tolerance genes are for example, but not excluding others, 19-51a, 31707, 42317, 81910, 281-24-236, 3006-210-23, BXN10211, BXN10215, BXN10222, BXN10224, MON1445, MON1698, MON88701, MON88913, GHB119, GHB614, LLCotton25, T303-3 and T304-40.

Transgenic canola events comprising herbicide tolerance genes are for example, but not excluding others, MON88302, HCR-1, HCN10, HCN28, HCN92, MS1, MS8, PHY14, PHY23, PHY35, PHY36, RF1, RF2 and RF3.

In another embodiment, PPOi-tolerant crops also useful for the present invention are those, which, by the use of recombinant DNA techniques and/or by breeding and/or otherwise selected for such characteristics, rendered able to synthesize one or more insecticidal proteins.

Insect resistance has mainly been created by transferring bacterial genes for insecticidal proteins to plants. Transgenes which have most frequently been used are toxin genes of *Bacillus* spec. and synthetic variants thereof, like cry1A, cry1Ab, cry1Ab-Ac, cry1Ac, cry1A.105, cry1F, cry1 Fa2, cry2Ab2, cry2Ae, mcry3A, ecry3.1Ab, cry3Bb1, cry34Ab1, cry35Ab1, cry9C, vip3A(a), vip3Aa20. However, also genes of plant origin have been transferred to other plants.

In particular genes coding for protease inhibitors, like CpTI and pinII. A further approach uses transgenes in order to produce double stranded RNA in plants to target and downregulate insect genes. An example for such a transgene is dvsnf7.

Transgenic corn events comprising genes for insecticidal proteins or double stranded RNA are for example, but not excluding others, Bt10, Bt11, Bt176, MON801, MON802, MON809, MON810, MON863, MON87411, MON88017, MON89034, 33121, 4114, 5307, 59122, TC1507, TC6275, CBH-351, MIR162, DBT418 and MZIR098.

Transgenic soybean events comprising genes for insecticidal proteins are for example, but not excluding others, MON87701, MON87751 and DAS-81419.

Transgenic cotton events comprising genes for insecticidal proteins are for example, but not excluding others, SGK321, MON531, MON757, MON1076, MON15985, 31707, 31803, 31807, 31808, 42317, BNLA-601, Event1, COT67B, COT102, T303-3, T304-40, GFM Cry1A, GK12, MLS 9124, 281-24-236, 3006-210-23, GHB119 and SGK321.

Increased yield has been created by increasing ear biomass using the transgene athb17, being present in corn event MON87403, or by enhancing photosynthesis using the transgene bbx32, being present in the soybean event MON87712.

In another embodiment, PPOi-tolerant crops also useful for the present invention are those, which, by the use of recombinant DNA techniques and/or by breeding and/or otherwise selected for such traits, altered to contain a modified amount of one or more substances or new substances, for example, to improve human or animal nutrition, e.g. oil crops that produce health-promoting long-chain omega-3 fatty acids or unsaturated omega-9 fatty acids (e.g. Nexera® rape, Dow Agro Sciences, Canada).

Crops comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-00410-5.

Traits are frequently combined by combining genes in a transformation event or by combining different events during the breeding process. Preferred combinations of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)" (http://www.isaaa.org/gmapprovaldatabase) and the "Center for Environmental Risk Assessment (CERA)" (http://cera-gmc.org/GMCropDatabase), as well as in patent applications, like EP3028573 and WO2017/011288.

The use of compositions according to the invention on crops may result in effects which are specific to a crop comprising a certain gene or event. These effects might involve changes in growth behavior or changed resistance to biotic or abiotic stress factors. Such effects may in particular comprise enhanced yield, enhanced resistance or tolerance to insects, nematodes, fungal, bacterial, *mycoplasma*, viral or viroid pathogens as well as early vigour, early or delayed ripening, cold or heat tolerance as well as changed amino acid or fatty acid spectrum or content.

Furthermore, plants are also covered that contain using recombinant DNA techniques a modified amount of ingredients or new ingredients, specifically to improve raw material production, e.g., potatoes that produce increased amounts of amylopectin.

Furthermore it has been found that the methods and compositions according to the invention are also suitable for post-emergent control PPOi resistant weeds, in particular in areas, where crop plants will be cultivated or are cultivated.

As used herein, the terms "PPO-i", "PPOis", "PPO-i" and "PPO-is" respectively stand for "PPO inhibitor(s)", "PPO inhibitor herbicide(s)", "PPO-inhibiting herbicide(s)", and refer to herbicides that inhibit the enzyme protoporphyrinogen IX oxidase of a plant.

As used herein, the term "resistant weed(s)" refers to a plant that, in relation to a treatment with an appropriate or over-appropriate rate of herbicidal application, has inherited, developed or acquired an ability
(1) to survive that treatment, if it is one that is lethal to (i.e. eradicates) the wild type weed; or
(2) to exhibit significant vegetative growth or thrive after that treatment, if it is one that suppresses growth of the wild-type weed.

Herbicide resistant weeds present a serious problem for efficient weed control because such resistant weeds are increasingly widespread and thus weed control by the application of herbicides is no longer effective. In particular PPO-i are a huge problem to farmers.

Thus, there is a need for an effective and efficient method for the control of herbicide resistant weeds, in particular PPOi resistant weeds.

Furthermore, it has been found that the compositions according to the invention are also suitable for the defoliation and/or desiccation of plant parts, for which crop plants such as cotton, potato, oilseed rape, sunflower, soybean or field beans, in particular cotton, are suitable. In this regard compositions have been found for the desiccation and/or defoliation of plants, processes for preparing these compositions, and methods for desiccating and/or defoliating plants using the compositions according to the invention.

As desiccants, the compositions according to the invention are suitable in particular for desiccating the above-ground parts of crop plants such as potato, oilseed rape, sunflower and soybean, but also cereals. This makes possible the fully mechanical harvesting of these important crop plants.

Also of economic interest is the facilitation of harvesting, which is made possible by concentrating within a certain period of time the dehiscence, or reduction of adhesion to the tree, in citrus fruit, olives and other species and varieties of pomaceous fruit, stone fruit and nuts. The same mechanism, i.e. the promotion of the development of abscission tissue between fruit part or leaf part and shoot part of the plants is also essential for the controlled defoliation of useful plants, in particular cotton.

Moreover, a shortening of the time interval in which the individual cotton plants mature leads to an increased fiber quality after harvesting.

Moreover, it may be advantageous to apply the compositions of the present invention on their own or jointly in combination with other crop protection agents, for example with agents for controlling pests or phytopathogenic fungi or bacteria, with groups of active compounds which regulate growth, or with safeners.

Safeners are chemical compounds which prevent or reduce damage on useful plants without having a major impact on the herbicidal action of the herbicidal active components of the present compositions towards unwanted plants. Safeners can be applied either before sowings (e.g. on seed treatments, shoots or seedlings) or in the pre-emergence application or post-emergence application of the crop.

The safeners and the herbicide A and/or the herbicides B can be applied jointly or separately.

Examples for safeners are benoxacor, cloquintocet, cyometrinil, cyprosulfamide, dichlormid, dicyclonon, dietholate, fenchlorazole, fenclorim, flurazole, fluxofenim, furilazole, isoxadifen, mefenpyr, mephenate, naphthalic anhydride, oxabetrinil, 4-(dichloroacetyl)-1-oxa-4-azaspiro[4.5]decane (MON4660, CAS 71526-07-3), 2,2,5-trimethyl-3-(dichloroacetyl)-1,3-oxazolidine (R-29148, CAS 52836-31-4), metcamifen and BPCMS (CAS 54091-06-4).

Also of interest is the miscibility with mineral salt solutions which are employed for treating nutritional and trace element deficiencies. Non-phytotoxic oils and oil concentrates can also be added.

The invention also relates to agrochemical compositions (formulations) comprising an auxiliary and a composition according to the invention.

The agrochemical compositions contain, besides the composition comprising herbicide A as component A, trifludimoxazin as component B, and optionally saflufenacil as component C, at least one organic or inorganic carrier material. The agrochemical compositions may also contain, if desired, one or more surfactants and, if desired, one or more further auxiliaries customary for crop protection compositions.

An agrochemical composition comprises a herbicidal effective amount of at least one composition according to the invention.

The term "effective amount" denotes an amount of the active ingredients, which is sufficient for controlling unwanted plants, especially for controlling unwanted plants in crops (i.e. cultivated plants) and which does not result in a substantial damage to the treated plants. Such an amount can vary in a broad range and is dependent on various factors, such as the plants to be controlled, the treated crop or material, the climatic conditions and the specific composition according to the invention used.

In the agrochemical compositions the active ingredients and optional further actives are present in suspended, emulsified or dissolved form. The agrochemical compositions can be in the form of aqueous solutions, powders, suspensions, also highly-concentrated aqueous, oily or other suspensions or dispersions, aqueous emulsions, aqueous microemulsions, aqueous suspo-emulsions, oil dispersions, pastes, dusts, materials for spreading or granules.

The herbicides A, B and optionally C, their salts or derivatives can be converted into customary types of agrochemical compositions, e. g. solutions, emulsions, suspensions, dusts, powders, pastes, granules, pressings, capsules, and mixtures thereof. Examples for agrochemical composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further agrochemical composition types are defined in the "Catalogue of pesticide formulation types and international coding system", Technical Monograph No. 2, 6$^{th}$ Ed. May 2008, CropLife International.

The agrochemical compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compound I on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), inorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for agrochemical composition types and their preparation are:

i) Water-Soluble Concentrates (SL, LS)

10-60 wt % of a compostion according to the invention and 5-15 wt % wetting agent (e.g. alcohol alkoxylates) are dissolved in water and/or in a water-soluble solvent (e.g. alcohols) ad 100 wt %. The active substance dissolves upon dilution with water.

ii) Dispersible Concentrates (DC)

5-25 wt % of a composition according to the invention and 1-10 wt % dispersant (e. g. polyvinylpyrrolidone) are dissolved in organic solvent (e.g. cyclohexanone) ad 100 wt %. Dilution with water gives a dispersion.

iii) Emulsifiable Concentrates (EC)

15-70 wt % of a composition according to the invention and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.

iv) Emulsions (EW, EO, ES)

5-40 wt % of a composition according to the invention and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of a composition according to the invention are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a stable suspension of the active substance. For FS type composition up to 40 wt % binder (e.g. polyvinylalcohol) is added.

vi) Water-Dispersible Granules and Water-Soluble Granules (WG, SG)

50-80 wt % of a composition according to the invention are ground finely with addition of dispersants and wetting agents (e.g. sodium lignosulfonate and alcohol ethoxylate) ad 100 wt % and prepared as water-dispersible or water-soluble granules by means of technical appliances (e. g. extrusion, spray tower, fluidized bed). Dilution with water gives a stable dispersion or solution of the active substance.

vii) Water-Dispersible Powders and Water-Soluble Powders (WP, SP, WS)

50-80 wt % of a composition according to the invention are ground in a rotor-stator mill with addition of 1-5 wt % dispersants (e.g. sodium lignosulfonate), 1-3 wt % wetting agents (e.g. alcohol ethoxylate) and solid carrier (e.g. silica gel) ad 100 wt %. Dilution with water gives a stable dispersion or solution of the active substance.

viii) Gel (GW, GF)

In an agitated ball mill, 5-25 wt % of a composition according to the invention are comminuted with addition of 3-10 wt % dispersants (e.g. sodium lignosulfonate), 1-5 wt % thickener (e.g. carboxymethylcellulose) and water ad 100 wt % to give a fine suspension of the active substance. Dilution with water gives a stable suspension of the active substance.

ix) Microemulsion (ME)

5-20 wt % of a composition according to the invention are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamically stable microemulsion.

x) Microcapsules (CS)

An oil phase comprising 5-50 wt % of a composition according to the invention, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of a compound I according to the invention, 0-40 wt % water insoluble organic solvent (e.g. aromatic hydrocarbon), and an isocyanate monomer (e.g. diphenylmethene-4,4'-diisocyanate) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS composition.

xi) Dustable Powders (DP, DS)

1-10 wt % of a composition according to the invention are ground finely and mixed intimately with solid carrier (e.g. finely divided kaolin) ad 100 wt %.

xii) Granules (GR, FG)

0.5-30 wt % of a composition according to the invention is ground finely and associated with solid carrier (e.g. silicate) ad 100 wt %. Granulation is achieved by extrusion, spray-drying or the fluidized bed.

xiii) Ultra-low volume liquids (UL)

1-50 wt % of a composition according to the invention are dissolved in organic solvent (e.g. aromatic hydrocarbon) ad 100 wt %.

The agrochemical compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Solutions for seed treatment (LS), suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The compositions in question give, after two-to-tenfold dilution, active substance concentrations of from 0.01 to 60% by weight, preferably from 0.1 to 40% by weight, in the ready-to-use preparations. Application can be carried out before or during sowing.

Methods for applying compositions of the invention on to plant propagation material, especially seeds include dressing, coating, pelleting, dusting, soaking and in-furrow application methods of the propagation material. Preferably, compound I or the compositions thereof, respectively, are applied on to the plant propagation material by a method such that germination is not induced, e. g. by seed dressing, pelleting, coating and dusting.

Various types of oils, wetters, adjuvants, fertilizer or micronutrients, further pesticides (e.g. herbicides, insecticides, fungicides, growth regulators) or safeners as mentioned above may be added to the compositions comprising herbicide A, trifludimoxazin and optionally saflufenacil as premix or, if appropriate not until immediately prior to use (tank mix).

These agents can be admixed with the compositions according to the invention in a weight ratio of 1:100 to 100:1, preferably 1:10 to 10:1.

The user applies the agrochemical composition according to the invention usually from a pre-dosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 10 to 2000 liters, preferably 50 to 400 liters, of the ready-to-use spray liquor are applied per hectare of agricultural useful area.

According to one embodiment, either individual components of the agrochemical composition according to the invention or partially premixed components, e. g. agrochemical components comprising herbicide A, trifludimoxazin and optionally saflufenacil may be mixed by the user in a spray tank and further auxiliaries and additives may be added, if appropriate.

In a further embodiment, individual components of the agrochemical composition according to the invention such as parts of a kit, or parts of a binary mixture, may be mixed by the user himself in a spray tank and further auxiliaries may be added, if appropriate.

The invention relates also to compositions in the form of herbicidal active agrochemical compositions comprising a herbicidally effective amount of a composition comprising herbicide A, trifludimoxazin and optionally saflufenacil as defined above, and also at least one liquid and/or solid carrier and/or one or more surfactants and, if desired, one or more further auxiliaries customary for agrochemical compositions.

Another embodiment of the invention relates to compositions in the form of an agrochemical composition formulated as a 1-component composition comprising herbicide A, trifludimoxazin and optionally saflufenacil as defined above, and a solid or liquid carrier and, if appropriate, one or more surfactants.

The invention also relates to compositions in the form of an agrochemical composition formulated as a 2-component composition comprising a first component comprising an herbicide A, a solid or liquid carrier and/or one or more surfactants, and a second component comprising trifludimoxazin, and optionally saflufenacil, a solid or liquid carrier and/or one or more surfactants, where additionally both components may also comprise further auxiliaries customary for agrochemical compositions.

The invention also relates to compositions in the form of an agrochemical composition formulated as a 2-component composition comprising a first component comprising an herbicide A and trifludimoxazin, a solid or liquid carrier and/or one or more surfactants, and a second component comprising saflufenacil, a solid or liquid carrier and/or one or more surfactants, where additionally both components may also comprise further auxiliaries customary for agrochemical compositions.

The invention also relates to compositions in the form of an agrochemical composition formulated as a 2-component composition comprising a first component comprising an herbicide A and saflufenacil, a solid or liquid carrier and/or one or more surfactants, and a second component comprising trifludimoxazin, a solid or liquid carrier and/or one or more surfactants, where additionally both components may also comprise further auxiliaries customary for agrochemical compositions.

The following examples serve to illustrate the invention.

EXAMPLES

In the examples below, using the method of S. R. Colby (1967) "Calculating synergistic and antagonistic responses of herbicide combinations", Weeds 15, p. 22ff., the value E, which is expected if the activity of the individual active compounds is only additive, was calculated:

$E = X + Y - (X \cdot Y/100)$ where

X=percent activity using active herbicide A at an application rate a;

Y=percent activity using active trifludimoxazin at an application rate b;

E=expected activity (in %) by A+B at application rates a+b.

If the value found experimentally is higher than the value E calculated according to Colby, a synergistic effect is present.

The following herbicides have been tested:

| herbicide | # in examples below |
|---|---|
| herbicide A-1 | A-1 |
| trifludimoxazin | B-1 |
| saflufenacil | C-1 |

The plants used in the greenhouse experiments were of the following species:

| EPPO code | Scientific name |
|---|---|
| ABUTH | Abutilon theophrasti |
| AMAPA | Amaranthus palmeri |
| AVEFA | Avena fatua |
| BOIFL | Spermacoce latifolia |
| BRADC | Brachiaria decumbens |
| CASOB | Senna obtusifolia |
| COMBE | Commelina benghalensis |
| CYPIR | Cyperus iria |
| DIGSA | Digitaria sanguinales |
| ECHCG | Echinocloa crus-galli |
| EPHHL | Euphorbia heterophylla |
| ERICA | Erigeron canadensis |
| HORVS | Hordeum vulgare |
| KCHSC | Kochia scoparia |
| LOLMU | Lolium multiflorum |
| SETFA | Setaria faberi |
| SETIT | Setaria italica |
| SETVI | Setaria viridis |
| SINAL | Sinapis alba |
| SORHA | Sorghum halapense |
| SORVU* | Sorghum bicolor |

The results of these tests are given below in the examples and demonstrate the synergistic effect of the composition comprising herbicide A, trifludimoxazin and optionally saflufenacil, when applied post-emergent to weeds.

In this context, a.i. means active ingredient, based on 100% active substance.

Example A—Post-Emergence Application in Greenhouse Trials

The culture containers used were plastic pots containing loamy sand with approximately 3.0% of humus as substrate. The seeds of the test plants were sown separately for each species.

For the post-emergence treatment, the test plants were grown to a plant height of from 3 to 15 cm, depending on the plant habit, and only then treated with the active compounds which had been suspended or emulsified in water. To this end, the test plants were either sown directly, and grown in the same containers, or they were first grown separately as seedlings and transplanted into the test containers a few days prior to treatment.

Depending on the species, the plants were kept at 10-25° C. and 20-35° C., respectively.

The test period extended over 2 to 4 weeks. During this time, the plants were tended and their response to the individual treatments was evaluated.

Evaluation was carried out using a scale from 0 to 100. 100 means no emergence of the plants, or complete destruction of at least the above-ground parts, and 0 means no damage or normal course of growth. A good herbicidal activity is given at values of at least 70, and very good herbicidal activity is given at values of at least 85.

In the greenhouse trials, unless indicated otherwise, herbicide A, trifludimoxazin and saflufenacil were formulated (50 g/I) and applied with addition of 1% MSO (methylated seed oil) as adjuvant. The solvent used was water (200 I/ha).

Example 1

Post-emergence application of Herbicide A-1 (A-1) and trifludimoxazin (B-1) in Greenhouse Trials

TABLE 1.1

Evaluation 6 DAT

| Weed | Growth stage | g ai/ha total A-1 | B-1 | % Herbicidal activity A-1 | B-1 | A-1 + B-1 | expected activity (Colby) |
|---|---|---|---|---|---|---|---|
| ABUTH | 33 | 0.3 | 0.3 | 65 | 20 | 85 | 72 |
| ABUTH | 33 | 0.8 | 0.4 | 85 | 35 | 98 | 90 |
| COMBE | 21 | 0.3 | 0.3 | 65 | 45 | 85 | 81 |
| KCHSC | 33 | 0.9 | 0.3 | 90 | 45 | 98 | 95 |
| KCHSC | 33 | 0.4 | 0.8 | 55 | 85 | 98 | 93 |

TABLE 1.2

Evaluation 7 DAT

| Weed | Growth stage | g ai/ha total A-1 | B-1 | % Herbicidal activity A-1 | B-1 | A-1 + B-1 | expected activity (Colby) |
|---|---|---|---|---|---|---|---|
| AVEFA | 13 | 1 | 0.2 | 65 | 20 | 80 | 72 |
| BRADC | 13 | 0.9 | 0.3 | 60 | 10 | 70 | 64 |
| BRADC | 13 | 0.8 | 0.4 | 50 | 10 | 70 | 55 |
| BRADC | 13 | 1 | 0.2 | 60 | 10 | 70 | 64 |
| BRADC | 13 | 0.4 | 0.8 | 40 | 45 | 75 | 67 |
| DIGSA | 12 | 0.3 | 0.3 | 45 | 15 | 75 | 53 |
| DIGSA | 12 | 0.8 | 0.4 | 65 | 15 | 95 | 70 |
| DIGSA | 12 | 0.4 | 0.8 | 50 | 45 | 80 | 73 |
| ECHCG | 13 | 0.4 | 0.8 | 40 | 40 | 70 | 64 |
| SETFA | 13 | 0.3 | 0.9 | 55 | 45 | 90 | 75 |
| SETFA | 13 | 0.3 | 0.3 | 55 | 40 | 85 | 73 |
| SETFA | 13 | 0.5 | 0.5 | 80 | 55 | 95 | 91 |
| SETVI | 14 | 0.3 | 0.9 | 30 | 55 | 85 | 69 |
| SETVI | 14 | 0.2 | 1 | 30 | 60 | 80 | 72 |
| SETVI | 14 | 0.3 | 0.3 | 30 | 35 | 75 | 55 |
| SETVI | 14 | 0.4 | 0.8 | 40 | 45 | 75 | 67 |

TABLE 1.3

Evaluation 7 DAT; B-1 formulated as 500 g/l

| Weed | Growth stage | g ai/ha total A-1 | B-1 | % Herbicidal activity A-1 | B-1 | A-1 + B-1 | expected activity (Colby) |
|---|---|---|---|---|---|---|---|
| BRADC | 13 | 2 | 2 | 90 | 15 | 98 | 92 |
| BRADC | 13 | 2 | 1 | 90 | 15 | 95 | 92 |
| SORHA | 14 | 2 | 2 | 80 | 35 | 95 | 87 |
| SORHA | 14 | 2 | 1 | 80 | 15 | 90 | 83 |

TABLE 1.4

Evaluation 19 DAT; B-1 formulated as 500 g/l

| Weed | Growth stage | g ai/ha total A-1 | B-1 | % Herbicidal activity A-1 | B-1 | A-1 + B-1 | expected activity (Colby) |
|---|---|---|---|---|---|---|---|
| DIGSA | 13 | 1 | 2 | 95 | 40 | 100 | 97 |

TABLE 1.5

Evaluation 20 DAT

| Weed | Growth stage | g ai/ha total A-1 | B-1 | % Herbicidal activity A-1 | B-1 | A-1 + B-1 | expected activity (Colby) |
|---|---|---|---|---|---|---|---|
| ABUTH | 33 | 0.3 | 0.3 | 15 | 0 | 85 | 15 |
| BRADC | 13 | 0.9 | 0.3 | 55 | 5 | 85 | 57 |
| COMBE | 21 | 0.3 | 0.9 | 45 | 15 | 70 | 53 |
| COMBE | 21 | 0.3 | 0.3 | 45 | 0 | 75 | 45 |
| ECHCG | 13 | 0.2 | 1.1 | 0 | 60 | 70 | 60 |
| ERICA | 19 | 0.2 | 1.1 | 10 | 40 | 80 | 46 |
| KCHSC | 33 | 0.9 | 0.3 | 90 | 35 | 98 | 94 |
| KCHSC | 33 | 0.3 | 0.9 | 55 | 80 | 100 | 91 |
| KCHSC | 33 | 0.2 | 1 | 15 | 98 | 100 | 98 |
| SETFA | 13 | 0.3 | 0.9 | 80 | 70 | 98 | 94 |
| SETFA | 13 | 0.3 | 0.3 | 80 | 15 | 95 | 83 |
| SETVI | 14 | 0.3 | 0.9 | 15 | 70 | 80 | 75 |
| SETVI | 14 | 0.3 | 0.3 | 15 | 10 | 80 | 24 |
| SORHA | 14 | 0.3 | 0.9 | 10 | 65 | 85 | 69 |
| SORHA | 14 | 0.2 | 1.1 | 10 | 65 | 95 | 69 |

TABLE 1.6

Evaluation 20 DAT; B-1 formulated as 500 g/l

| Weed | Growth stage | g ai/ha total A-1 | B-1 | % Herbicidal activity A-1 | B-1 | A-1 + B-1 | expected activity (Colby) |
|---|---|---|---|---|---|---|---|
| AVEFA | 12 | 2 | 1 | 98 | 15 | 100 | 98 |
| BRADC | 13 | 2 | 2 | 90 | 10 | 100 | 91 |
| SORHA | 14 | 2 | 2 | 60 | 30 | 80 | 72 |

The results of the greenhouse tests as shown in example 1 (tables 1.1 to 1.6) demonstrate that the application of a composition comprising an herbicide A and trifludimoxazin, when applied post-emergent, leads to a better herbicidal activity against (emerged) weeds, than would have been expected based on the herbicidal activity observed for the individual compounds.

Example 2

Post-Emergence Application of Herbicide A-1 (A-1), Trifludimoxazin (B-1) and Saflufenacil (C-1) in Greenhouse Trials

TABLE 2.1

| | | Evaluation 6 DAT | | | | | |
|---|---|---|---|---|---|---|---|
| | Growth | g ai/ha total | | % Herbicidal activity | | | expected activity |
| Weed | stage | A-1 | B-1 + C-1 | A-1 | B-1 + C-1 | A-1 + B-1 + C-1 | (Colby) |
| ABUTH | 33 | 0.2 | 0.2 + 1.1 | 65 | 55 | 90 | 84 |
| KCHSC | 33 | 0.5 | 0.5 + 0.5 | 65 | 80 | 98 | 93 |

TABLE 2.2

| | | Evaluation 6 DAT | | | | | |
|---|---|---|---|---|---|---|---|
| | Growth | g ai/ha total | | % Herbicidal activity | | | expected activity |
| Weed | stage | A-1 + B-1 | C-1 | A-1 + B-1 | C-1 | A-1 + B-1 + C-1 | (Colby) |
| ABUTH | 33 | 0.2 + 0.2 | 1.1 | 75 | 45 | 90 | 86 |
| KCHSC | 33 | 0.5 + 0.5 | 0.5 | 80 | 60 | 98 | 92 |

TABLE 2.3

| | | Evaluation 6 DAT | | | | | |
|---|---|---|---|---|---|---|---|
| | Growth | g ai/ha total | | % Herbicidal activity | | | expected activity |
| Weed | stage | A-1 + C-1 | B-1 | A-1 + C-1 | B-1 | A-1 + B-1 + C-1 | (Colby) |
| ABUTH | 33 | 0.2 + 1.1 | 0.2 | 40 | 20 | 90 | 53 |
| KCHSC | 33 | 0.5 + 0.5 | 0.5 | 75 | 80 | 98 | 95 |

TABLE 2.4

| | | Evaluation 6 DAT | | | | | | |
|---|---|---|---|---|---|---|---|---|
| | Growth | g ai/ha total | | | % Herbicidal activity | | | expected activity |
| Weed | stage | A-1 | B-1 | C-1 | A-1 | B-1 | C-1 | A-1 + B-1 + C-1 | (Colby)* |
| ABUTH | 33 | 0.2 | 0.2 | 1.1 | 65 | 20 | 45 | 90 | 81 |
| KCHSC | 33 | 0.5 | 0.5 | 0.5 | 65 | 80 | 60 | 98 | 97 |

*Colby calculated as $(A + B + C) - \{[(A*B) + (A*C) + (B*C)]/100\} + [(A*B*C)/10000]$

TABLE 2.5

| | | Evaluation 7 DAT | | | | | |
|---|---|---|---|---|---|---|---|
| | Growth | g ai/ha total | | % Herbicidal activity | | | expected activity |
| Weed | stage | A-1 | B-1 + C-1 | A-1 | B-1 + C-1 | A-1 + B-1 + C-1 | (Colby) |
| DIGSA | 12 | 0.9 | 0.3 + 0.3 | 90 | 40 | 95 | 94 |
| SETFA | 13 | 0.5 | 0.5 + 0.5 | 80 | 50 | 98 | 90 |

TABLE 2.5-continued

Evaluation 7 DAT

| Weed | Growth stage | g ai/ha total A-1 | g ai/ha total B-1 + C-1 | % Herbicidal activity A-1 | % Herbicidal activity B-1 + C-1 | % Herbicidal activity A-1 + B-1 + C-1 | expected activity (Colby) |
|---|---|---|---|---|---|---|---|
| SETFA | 13 | 0.3 | 0.3 + 0.9 | 55 | 45 | 90 | 75 |
| SETVI | 14 | 0.3 | 0.3 + 0.9 | 30 | 35 | 90 | 55 |

TABLE 2.6

Evaluation 7 DAT

| Weed | Growth stage | g ai/ha total A-1 + B-1 | g ai/ha total C-1 | % Herbicidal activity A-1 + B-1 | % Herbicidal activity C-1 | % Herbicidal activity A-1 + B-1 + C-1 | expected activity (Colby) |
|---|---|---|---|---|---|---|---|
| DIGSA | 12 | 0.9 + 0.3 | 0.3 | 85 | 10 | 95 | 87 |
| SETFA | 13 | 0.5 + 0.5 | 0.5 | 95 | 10 | 98 | 96 |
| SETFA | 13 | 0.3 + 0.3 | 0.9 | 85 | 15 | 90 | 87 |
| SETVI | 14 | 0.3 + 0.3 | 0.9 | 75 | 35 | 90 | 84 |

TABLE 2.7

Evaluation 7 DAT

| Weed | Growth stage | g ai/ha total A-1 + C-1 | g ai/ha total B-1 | % Herbicidal activity A-1 + C-1 | % Herbicidal activity B-1 | % Herbicidal activity A-1 + B-1 + C-1 | expected activity (Colby) |
|---|---|---|---|---|---|---|---|
| DIGSA | 12 | 0.9 + 0.3 | 0.3 | 80 | 15 | 95 | 83 |
| SETFA | 13 | 0.5 + 0.5 | 0.5 | 85 | 55 | 98 | 93 |
| SETFA | 13 | 0.3 + 0.9 | 0.3 | 80 | 40 | 90 | 88 |
| SETVI | 14 | 0.3 + 0.9 | 0.3 | 60 | 35 | 90 | 74 |

TABLE 2.8

Evaluation 7 DAT

| Weed | Growth stage | g ai/ha total A-1 | g ai/ha total B-1 | g ai/ha total C-1 | % Herbicidal activity A-1 | % Herbicidal activity B-1 | % Herbicidal activity C-1 | % Herbicidal activity A-1 + B-1 + C-1 | expected activity (Colby)* |
|---|---|---|---|---|---|---|---|---|---|
| DIGSA | 12 | 0.9 | 0.3 | 0.3 | 90 | 10 | 15 | 95 | 92 |
| SETFA | 13 | 0.5 | 0.5 | 0.5 | 80 | 10 | 55 | 98 | 92 |
| SETFA | 13 | 0.3 | 0.3 | 0.9 | 55 | 15 | 40 | 90 | 77 |
| SETVI | 14 | 0.3 | 0.3 | 0.9 | 30 | 35 | 35 | 90 | 70 |

*Colby calculated as (A + B + C) − {[(A*B) + (A*C) + (B*C)]/100} + [(A*B*C)/10000]

TABLE 2.9

| | | Evaluation 20 DAT | | | | | |
|---|---|---|---|---|---|---|---|
| | Growth | g ai/ha total | | % Herbicidal activity | | | expected activity |
| Weed | stage | A-1 | B-1 + C-1 | A-1 | B-1 + C-1 | A-1 + B-1 + C-1 | (Colby) |
| ABUTH | 33 | 0.2 | 0.2 + 1.1 | 15 | 50 | 85 | 58 |
| AVEFA | 13 | 0.3 | 0.9 + 0.3 | 15 | 20 | 70 | 32 |
| COMBE | 21 | 0.3 | 0.3 + 0.9 | 45 | 75 | 100 | 86 |
| KCHSC | 33 | 0.5 | 0.5 + 0.5 | 55 | 60 | 100 | 82 |
| KCHSC | 33 | 0.3 | 0.3 + 0.9 | 55 | 70 | 100 | 87 |
| LOLMU | 13 | 0.3 | 0.9 + 0.3 | 10 | 10 | 60 | 19 |
| SETVI | 14 | 0.3 | 0.3 + 0.9 | 15 | 15 | 90 | 28 |
| SORHA | 14 | 0.3 | 0.3 + 0.9 | 10 | 5 | 60 | 15 |

TABLE 2.10

| | | Evaluation 20 DAT | | | | | |
|---|---|---|---|---|---|---|---|
| | Growth | g ai/ha total | | % Herbicidal activity | | | expected activity |
| Weed | stage | A-1 + B-1 | C-1 | A-1 + B-1 | C-1 | A-1 + B-1 + C-1 | (Colby) |
| ABUTH | 33 | 0.2 + 0.2 | 1.1 | 65 | 0 | 85 | 65 |
| AVEFA | 13 | 0.3 + 0.3 | 0.3 | 10 | 0 | 70 | 10 |
| COMBE | 21 | 0.3 + 0.3 | 0.9 | 75 | 80 | 100 | 95 |
| KCHSC | 33 | 0.5 + 0.5 | 0.5 | 70 | 40 | 100 | 82 |
| KCHSC | 33 | 0.3 + 0.3 | 0.9 | 70 | 60 | 100 | 88 |
| LOLMU | 13 | 0.3 + 0.9 | 0.3 | 40 | 0 | 60 | 40 |
| SETVI | 14 | 0.3 + 0.3 | 0.9 | 80 | 35 | 90 | 87 |
| SORHA | 14 | 0.3 + 0.3 | 0.9 | 50 | 0 | 60 | 50 |

TABLE 2.11

| | | Evaluation 20 DAT | | | | | |
|---|---|---|---|---|---|---|---|
| | Growth | g ai/ha total | | % Herbicidal activity | | | expected activity |
| Weed | stage | A-1 + C-1 | B-1 | A-1 + C-1 | B-1 | A-1 + B-1 + C-1 | (Colby) |
| ABUTH | 33 | 0.2 + 1.1 | 0.2 | 15 | 0 | 85 | 15 |
| AVEFA | 13 | 0.3 + 0.3 | 0.9 | 5 | 20 | 70 | 24 |
| COMBE | 21 | 0.3 + 0.9 | 0.3 | 80 | 0 | 100 | 80 |
| KCHSC | 33 | 0.5 + 0.5 | 0.5 | 65 | 75 | 100 | 91 |
| KCHSC | 33 | 0.3 + 0.9 | 0.3 | 85 | 35 | 100 | 90 |
| LOLMU | 13 | 0.3 + 0.3 | 0.9 | 10 | 15 | 60 | 24 |
| SETVI | 14 | 0.3 + 0.9 | 0.3 | 55 | 10 | 90 | 60 |
| SORHA | 14 | 0.3 + 0.9 | 0.3 | 5 | 10 | 60 | 15 |

TABLE 2.12

| | | Evaluation 20 DAT | | | | | | | |
|---|---|---|---|---|---|---|---|---|---|
| | Growth | g ai/ha total | | | % Herbicidal activity | | | | expected activity |
| Weed | stage | A-1 | B-1 | C-1 | A-1 | B-1 | C-1 | A-1 + B-1 + C-1 | (Colby)* |
| ABUTH | 33 | 0.2 | 0.2 | 1.1 | 15 | 0 | 0 | 85 | 15 |
| AVEFA | 13 | 0.3 | 0.9 | 0.3 | 15 | 20 | 0 | 70 | 32 |
| COMBE | 21 | 0.3 | 0.3 | 0.9 | 45 | 0 | 80 | 100 | 89 |
| KCHSC | 33 | 0.5 | 0.5 | 0.5 | 55 | 75 | 40 | 100 | 93 |

TABLE 2.12-continued

Evaluation 20 DAT

| Weed | Growth stage | g ai/ha total A-1 | B-1 | C-1 | % Herbicidal activity A-1 | B-1 | C-1 | A-1 + B-1 + C-1 | expected activity (Colby)* |
|---|---|---|---|---|---|---|---|---|---|
| KCHSC | 33 | 0.3 | 0.3 | 0.9 | 55 | 35 | 60 | 100 | 88 |
| LOLMU | 13 | 0.3 | 0.9 | 0.3 | 10 | 15 | 0 | 60 | 24 |
| SETVI | 14 | 0.3 | 0.3 | 0.9 | 15 | 10 | 35 | 90 | 50 |
| SORHA | 14 | 0.3 | 0.3 | 0.9 | 10 | 10 | 0 | 60 | 19 |

*Colby calculated as (A + B + C) − {[(A*B) + (A*C) + (B*C)]/100} + [(A*B*C)/10000]

The results of the greenhouse tests as shown in example 2 (tables 2.1 to 2.12) demonstrate that the application of a composition comprising an herbicide A, trifludimoxazin and saflufenacil, when applied post-emergent, leads to a better herbicidal activity against (emerged) weeds, than would have been expected based on the herbicidal activity observed for the individual compounds.

Example B—Post-Emergence Application in Field Trials

On field test sites, natural weed infestation or seeded weeds were treated post-emergence of the weeds.

In the field trials, the weedy plants were treated as indicated below.

Herbicide A-1 (342 g/l), trifludimoxazin (500 g/l) and saflufenacil (342 g/l) were, together with addition of 1% MSO (methylated seed oil) as adjuvant (unless indicated otherwise), formulated in water as distribution medium as indicated and sprayed with commercial flat fan nozzles.

In the following experiments, the herbicidal activity for the individual herbicidal compositions (solo and mixture applications) was assessed at the indicated days after treatment (DAT). The assessments for the damage on undesired weeds caused by the composition was carried out using a scale from 0 to 100%, compared to the untreated control plants. Here, 0 means no damage and 100 means complete destruction of the plants.

Example 3

Post-Emergence Application of Herbicide A-1 (A-1) and Trifludimoxazin (B-1) in Field Trials

TABLE 3.1

Evaluation 3 DAT; water volume 300 l/ha; burndown in fruit plantation (citrus)

| Weed | Growth stage | Height [cm] | g ai/ha total A-1 | B-1 | % Herbicidal activity A-1 | B-1 | A-1 + B-1 | expected activity (Colby) |
|---|---|---|---|---|---|---|---|---|
| CYPIR | 13-14 | 3-5 | 25 | 25 | 23 | 65 | 95 | 73 |

TABLE 3.2

Evaluation 21 DAT; water volume 200 l/ha; applied with 0.25 l/ha Dash MSO Max ®; pre plant burndown

| Weed | Height [cm] | g ai/ha total A-1 | B-1 | % Herbicidal activity A-1 | B-1 | A-1 + B-1 | expected activity (Colby) |
|---|---|---|---|---|---|---|---|
| AMAPA | 30 | 12.5 | 12.5 | 70 | 20 | 85 | 76 |
| AMAPA | 30 | 25 | 12.5 | 85 | 20 | 95 | 88 |

TABLE 3.3

Evaluation 28 DAT; water volume 100 l/ha; pre plant burndown

| Weed | Growth Stage | Height [cm] | g ai/ha total A-1 | B-1 | % Herbicidal activity A-1 | B-1 | A-1 + B-1 | expected activity (Colby) |
|---|---|---|---|---|---|---|---|---|
| HORVS | 21-24 | 15-37 | 18 | 18 | 89 | 0 | 94 | 89 |
| KCHSC | 11-16 | 1-9 | 18 | 18 | 57 | 68 | 90 | 86 |

TABLE 3.4

Evaluation 29 DAT; water volume 100 l/ha; pre plant burndown

| Weed | Growth stage | Height [cm] | g ai/ha total A-1 | B-1 | % Herbicidal activity A-1 | B-1 | A-1 + B-1 | expected activity (Colby) |
|---|---|---|---|---|---|---|---|---|
| AVEFA | 14-23 | 24-40 | 18 | 18 | 80 | 0 | 85 | 80 |
| HORVS | 15-24 | 25-45 | 18 | 18 | 73 | 0 | 78 | 73 |

The results of the field trials as shown in example 3 (tables 3.1 to 3.4) demonstrate that the application of a composition comprising an herbicide A and trifludimoxazin, when applied post-emergent, leads to a better herbicidal activity against (emerged) weeds, than would have been expected based on the herbicidal activity observed for the individual compounds.

Example 4

Post-Emergence Application of Herbicide A-1 (A-1), Trifludimoxazin (B-1) and Saflufenacil (C-1) in Field Trials

TABLE 4.1

Evaluation 29 DAT; water volume 100 l/ha; pre plant burndown

| Weed | Growth stage | Height [cm] | g ai/ha total A-1 | B-1 + C-1 | % Herbicidal activity A-1 | B-1 + C-1 | A-1 + B-1 + C-1 | expected activity (Colby) |
|---|---|---|---|---|---|---|---|---|
| AVEFA | 14-23 | 24-40 | 18 | 6 + 12 | 80 | 0 | 87 | 80 |
| HORSV | 15-24 | 25-45 | 18 | 6 + 12 | 73 | 0 | 78 | 73 |

TABLE 4.2

Evaluation 29 DAT; water volume 100 l/ha; pre plant burndown

| Weed | Growth stage | Height [cm] | g ai/ha total A-1 | B-1 | C-1 | % Herbicidal activity A-1 | B-1 | C-1 | A-1 + B-1 + C-1 | expected activity (Colby)* |
|---|---|---|---|---|---|---|---|---|---|---|
| AVEFA | 14-23 | 24-40 | 18 | 18 | 18 | 80 | 0 | 0 | 87 | 80 |
| HORSV | 15-24 | 25-45 | 18 | 18 | 18 | 73 | 0 | 0 | 82 | 73 |

*Colby calculated as $(A + B + C) - \{[(A*B) + (A*C) + (B*C)]/100\} + [(A*B*C)/10000]$ The results of the field trials as shown in example 4 (tables 4.1 to 4.2) demonstrate that the application of a composition comprising an herbicide A, trifludimoxazin and saflufenacil, when applied post-emergent, leads to a better herbicidal activity against (emerged) weeds, than would have been expected based on the herbicidal activity observed for the individual compounds.

Example 5

Post-Emergence Application of Herbicide A-1 (A-1) and Trifludimoxazin (B-1) in Field Trials Herbicide A-1 (100 g/l) and trifludimoxazin (500 g/l) were, together with addition of 1% MSO (methylated seed oil) as adjuvant (unless indicated otherwise), formulated in water as distribution medium as indicated and sprayed with commercial flat fan nozzles.

TABLE 5.1

Evaluation 3 DAT; water volume 200 l/ha

| Weed | Growth Stage | Height [cm] | g ai/ha total A-1 | B-1 | % Herbicidal activity A-1 | B-1 | A-1 + B-1 | expected activity (Colby) |
|---|---|---|---|---|---|---|---|---|
| BRADC | 21-31 | 3-20 | 20 | 12.5 | 77 | 43 | 93 | 83 |

TABLE 5.2

Evaluation 3 DAT; water volume 200 l/ha

| Weed | Growth Stage | Height [cm] | g ai/ha total A-1 | B-1 | % Herbicidal activity A-1 | B-1 | A-1 + B-1 | expected activity (Colby) |
|---|---|---|---|---|---|---|---|---|
| CYPIR | 13-14 | 3-5 | 25 | 25 | 23 | 63 | 95 | 73 |

TABLE 5.3

Evaluation 7 DAT; water volume 200 l/ha

| Weed | Growth Stage | Height [cm] | g ai/ha total A-1 | B-1 | % Herbicidal activity A-1 | B-1 | A-1 + B-1 | expected activity (Colby) |
|---|---|---|---|---|---|---|---|---|
| SINAL | 14-21 | 11-12 | 12.5 | 12.5 | 55 | 82 | 94 | 92 |

TABLE 5.4

Evaluation 8 DAT; water volume 200 l/ha

| Weed | Growth Stage | Height [cm] | g ai/ha total A-1 | B-1 | % Herbicidal activity A-1 | B-1 | A-1 + B-1 | expected activity (Colby) |
|---|---|---|---|---|---|---|---|---|
| BOILF | 12-16 | 3-10 | 20 | 12.5 | 75 | 68 | 99 | 92 |
| BOILF | 12-16 | 3-10 | 30 | 12.5 | 82 | 68 | 99 | 94 |

TABLE 5.5

Evaluation 22 DAT; water volume 200 l/ha

| Weed | Growth Stage | g ai/ha total A-1 | B-1 | % Herbicidal activity A-1 | B-1 | A-1 + B-1 | expected activity (Colby) |
|---|---|---|---|---|---|---|---|
| SETIT | 21-31 | 30 | 12.5 | 88 | 27 | 96 | 91 |
| SORVU* | 21-31 | 20 | 12.5 | 93 | 20 | 99 | 94 |

*volunteer crop; non PPO-i herbicide tolerant

TABLE 5.6

Evaluation 22 DAT; water volume 200 l/ha

| Weed | Growth Stage | g ai/ha total A-1 | g ai/ha total B-1 | % Herbicidal activity A-1 | % Herbicidal activity B-1 | A-1 + B-1 | expected activity (Colby) |
|---|---|---|---|---|---|---|---|
| ERICA | 15-20 | 25 | 25 | 70 | 27 | 95 | 78 |

TABLE 5.7

Evaluation 43 DAT; water volume 200 l/ha

| Weed | Growth Stage | Height [cm] | g ai/ha total A-1 | g ai/ha total B-1 | % Herbicidal activity A-1 | % Herbicidal activity B-1 | A-1 + B-1 | expected activity (Colby) |
|---|---|---|---|---|---|---|---|---|
| CASOB | 12-35 | 5-20 | 20 | 12.5 | 58 | 48 | 87 | 78 |
| CASOB | 12-35 | 5-20 | 30 | 12.5 | 73 | 48 | 90 | 86 |
| EPHHL | 16-18 | 10-15 | 20 | 12.5 | 73 | 60 | 92 | 89 |

The results of the field trials as shown in example 5 (tables 5.1 to 5.7) demonstrate that the application of a composition comprising an herbicide A and trifludimoxazin when applied post-emergent, leads to a better herbicidal activity against (emerged) weeds, than would have been expected based on the herbicidal activity observed for the individual compounds.

The invention claimed is:

1. A method for post-emergent weed control, which comprises applying an effective amount of a composition comprising
    A) herbicide A1:
        ethyl 2-[2-[[3-chloro-5-fluoro-6-[3-methyl-2,6-dioxo-4-(trifluoromethyl)pyrimidin-1-yl]-2-pyridyl]oxy]phenoxy]acetate; and
    B) trifludimoxazin; and
    C) optionally safluenacil, and/or its agriculturally acceptable salts;
    to an area, where weeds are growing,
    wherein the weight ratio of herbicide A-1 to trifludimoxazin is in the range of from 5:1 to 1:5.

2. The method of claim 1, wherein the composition comprises saflufenacil and wherein the weight ratio of herbicide A-1 to saflufenacil is in the range of from 5:1 to 1:5.

3. The method of claim 2, wherein the weight ratio of herbicide A-1 to trifludimoxazin to saflufenacil is in the range of 5:1:1 to 1:5:5, 1:5:1 to 5:1:5 or 1:1:5 to 5:5:1.

4. The method of claim 1, wherein the herbicide A-1, trifludimoxazin and optionally saflufenacil are applied jointly.

5. The method of claim 1, wherein the weeds to be controlled are monocotyledonous weeds and volunteer crop plants.

6. The method of claim 1, wherein the weeds are selected from the families of Commelinaceae, Cyperaceae and Poaceae.

7. The method of claim 1, wherein herbicide A-1, trifludimoxazin and optionally saflufenacil are applied when the weeds are between 2 and 60 cm tall.

8. The method of claim 1, wherein the herbicide A-1, trifludimoxazin and optionally saflufenacil are applied to the area wherein weeds are growing prior to seeding and/or planting or after seeding and/or planting of crop plants, but before emergence of the crop plants.

9. The method of claim 1, wherein the herbicide A-1, trifludimoxazin and optionally saflufenacil are applied to the area where weeds are growing, and wherein the area further comprises crop plants which have been rendered tolerant to PPO-inhibiting herbicides.

10. The method of claim 8, wherein the crop plants are selected from *Glycine max*, *Zea mays*, *Gossypium hirsutum*, *Gossypium arboreum*, *Gossypium herbaceum*, *Gossypium vitifolium*, *Oryza sativa*, *Oryza glaberrima*, *Brassica napus*, *Citrus limon*, *Citrus sinensis*, *Elaeis guineensis*, *Lens culinaris*, *Pisum sativum* and *Phaseolus vulgaris*.

11. A composition comprising
    A) herbicide A-1
        ethyl 2-[2-[[3-chloro-5-fluoro-6-[3-methyl-2,6-dioxo-4-(trifluoromethyl)pyrimidin-1-yl]-2-pyridyl]oxy]phenoxy]acetate; and
    trifludimoxazin
    wherein the weight ratio of herbicide A-1 to trifludimoxazin is in the range of from 5:1 to 1:5.

12. The composition of claim 11, wherein the weight ratio of herbicide A-1 to trifludimoxazin is in the range of from 2:1 to 1:2.

13. The composition of claim 11, wherein the weight ratio of herbicide A-1 to trifludimoxazin is about 1:1.

14. A composition comprising
    A) herbicide A-1:
        ethyl 2-[2-[[3-chloro-5-fluoro-6-[3-methyl-2,6-dioxo-4-(trifluoromethyl)pyrimidin-1-yl]-2-pyridyl]oxy]phenoxy]acetate;
    B) trifludimoxazin; and
    C) safluenacil, and/or its agriculturally acceptable salts;
    wherein the weight ratio of herbicide A-1 to saflufenacil is in the range of from 5:1 to 1:5.

15. The composition of claim 14, wherein the weight ratio of herbicide A-1 to trifludimoxazin to saflufenacil is in the range of 5:1:1 to 1:5:5, 1:5:1 to 5:1:5 or 1:1:5 to 5:5:1.

16. The composition of claim 14, wherein the weight ratio of herbicide A-1 to trifludimoxazin to saflufenacil is 1:1:1, 1:1:2, 1:1:3, 2:1:2, 2:1:3 or 2:1:4.

* * * * *